US010390183B2

(12) United States Patent
Taylor

(10) Patent No.: US 10,390,183 B2
(45) Date of Patent: Aug. 20, 2019

(54) LIGHT FIXTURE POSITIONING SYSTEM THAT TRANSMITS BEACON SIGNALS HAVING DIFFERENT SPATIAL RESOLUTIONS

(71) Applicant: LSI Industries, Inc., Cincinnati, OH (US)

(72) Inventor: Bobby Duane Taylor, Blue Ash, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 15/441,968

(22) Filed: Feb. 24, 2017

(65) Prior Publication Data

US 2018/0249297 A1    Aug. 30, 2018

(51) Int. Cl.
*G01S 1/68* (2006.01)
*G01S 1/06* (2006.01)
(Continued)

(52) U.S. Cl.
CPC ............... *H04W 4/04* (2013.01); *G01S 1/06* (2013.01); *G01S 1/68* (2013.01); *G01S 5/0205* (2013.01); *G01S 5/02* (2013.01)

(58) Field of Classification Search
CPC .............................. H04W 4/04; G01S 5/0205
See application file for complete search history.

(56) References Cited

U.S. PATENT DOCUMENTS 6,957,043 B2  10/2005  Angermann et al.
7,162,258 B2  1/2007  Beach et al.
(Continued)

FOREIGN PATENT DOCUMENTS

| EP | 2733502 A1 | 5/2014 |
|---|---|---|
| EP | 3118820 A1 | 1/2017 |
| WO | 2017006184 A1 | 1/2017 |

OTHER PUBLICATIONS

International Searching Authority, Search Report and Written Opinion issued in International Application No. PCT/US2018/019722 dated May 16, 2018 (16 pages).
(Continued)

*Primary Examiner* — Joseph E Dean, Jr.
(74) *Attorney, Agent, or Firm* — Wood Herron & Evans LLP

(57) ABSTRACT

Systems, methods, and computer program products for determining the location of, and for communicating with a mobile device. An intelligent fixture transmits a first signal having a first spatial resolution and a second signal having a second spatial resolution. The spatial resolutions may be determined by a radiation pattern of the antenna broadcasting the signal. The mobile device receives at least one of the first and second signals, and determines an approximate location based thereon. An approximate location based on the first signal may be more accurate than an approximate location based on the second signal due to the different spatial resolutions of the signals. Location specific information may be transmitted to the mobile device based on the approximate location. The intelligent fixture may use an antenna having one spatial resolution for transmitting and receiving communication signals, and another antenna having a different spatial resolution for broadcasting beacon signals.

23 Claims, 11 Drawing Sheets

(51) Int. Cl.
*G01S 5/02* (2010.01)
*H04W 4/04* (2009.01)

(56) References Cited

U.S. PATENT DOCUMENTS

| | | | |
|---|---|---|---|
| 7,741,782 | B2 | 6/2010 | Vermeulen et al. |
| 8,121,612 | B2 | 2/2012 | Lewis et al. |
| 8,457,793 | B2 | 6/2013 | Golding et al. |
| 9,002,522 | B2 | 4/2015 | Mohan et al. |
| 9,063,212 | B2 | 6/2015 | Jones, Jr. |
| 9,125,019 | B1 * | 9/2015 | Heikkila ............... H04W 4/029 |
| 9,125,255 | B2 | 9/2015 | Ramer et al. |
| 9,287,976 | B2 | 3/2016 | Ganick et al. |
| 9,345,115 | B2 | 5/2016 | Mohan |
| 9,351,378 | B2 | 5/2016 | Aggarwal et al. |
| 9,447,960 | B2 | 9/2016 | Kusakari |
| 9,509,402 | B2 | 11/2016 | Ryan et al. |
| 2003/0146835 | A1 * | 8/2003 | Carter ................... G01S 5/0036 340/539.13 |
| 2007/0103007 | A1 * | 5/2007 | Miki .................. H05B 37/0272 307/149 |
| 2012/0197729 | A1 | 8/2012 | Bertram et al. |
| 2014/0175990 | A1 | 6/2014 | Bhatkar et al. |
| 2014/0370917 | A1 | 12/2014 | Buchheim et al. |
| 2015/0072618 | A1 | 3/2015 | Granbery |
| 2015/0103515 | A1 | 4/2015 | Bosua et al. |
| 2015/0123563 | A1 | 5/2015 | Dahlen |
| 2015/0294514 | A1 | 10/2015 | McCollum et al. |
| 2015/0351204 | A1 * | 12/2015 | Hershberg ............. G08C 23/02 315/153 |
| 2015/0382436 | A1 * | 12/2015 | Kelly ..................... G08C 17/02 315/131 |
| 2016/0056971 | A1 | 2/2016 | Kazanchian |
| 2016/0066123 | A1 | 3/2016 | Ko et al. |
| 2016/0127875 | A1 | 5/2016 | Zampini, II |
| 2016/0219676 | A1 | 7/2016 | Mohan et al. |
| 2016/0248506 | A1 | 8/2016 | Ryan et al. |
| 2016/0284147 | A1 | 9/2016 | Trani |
| 2016/0286543 | A1 | 9/2016 | Putterman et al. |
| 2016/0286619 | A1 | 9/2016 | Roberts et al. |
| 2016/0286624 | A1 | 9/2016 | Patel et al. |
| 2016/0323754 | A1 | 11/2016 | Friday et al. |
| 2016/0345129 | A1 * | 11/2016 | Lee ....................... H04W 4/023 |
| 2016/0353238 | A1 * | 12/2016 | Gherardi ............... H04W 4/021 |
| 2016/0358189 | A1 | 12/2016 | Furry et al. |
| 2017/0018001 | A1 | 1/2017 | Tunnell et al. |

OTHER PUBLICATIONS

Dot Origin Limited, "DTAG100 User Reference Guide Firmware Version V2.2.x," Copyrighted 2012-2014 (25 pages).
International Searching Authority, Search Report and Written Opinion issued in International Application No. PCT/US2018/029318 dated Jul. 10, 2018 (14 pages).
Samsung, "Samsung Smart Signage Electronic Shelf Label," marketing material produced by Samsung Electroics Co., Ltd., 2016 (4 pages).

* cited by examiner

LIGHT FIXTURE POSITIONING SYSTEM THAT TRANSMITS BEACON SIGNALS HAVING DIFFERENT SPATIAL RESOLUTIONS

FIELD OF THE INVENTION

This invention generally relates to indoor positioning systems and, in particular, to methods, systems, and computer program products for determining the location of a mobile device.

BACKGROUND OF THE INVENTION

A beacon, such as a Bluetooth™ beacon, is a transmitter that sends signals which may be received by a mobile device, such as a smart phone or tablet computer, when the mobile device is in close proximity to the beacon. Beacons may provide location-specific information to the mobile device and may be useful in number of commercial and retail situations. Conventional beacon technology, however, suffers from a number of drawbacks.

For example, conventional beacons are generally battery powered, and may only transmit infrequently due to power constraints. Infrequent transmission may lead to "dead spots" and low "time on" characteristics. This behavior may cause latency, which can result in the mobile device failing to properly receive information from the beacon due to movement of the mobile device since the last transmission.

Beacons are generally stand-alone devices that provide one-way communication from the beacon to the mobile device. In environments having multiple beacons in close proximity, the mobile device may have difficulty determining which beacon signal should be used. This can result in the mobile device being unable to accurately determine its location. Thus, conventional beacons are not well suited to many applications requiring mobile devices to determine their location, or to applications such as building management that requires automation and networking of multiple beacons.

Thus, improved systems, methods, and computer program products for determining the location of a mobile device using beacons are needed, particularly in environments where there are multiple beacons in close proximity.

SUMMARY OF THE INVENTION

In an embodiment of the invention, a method of determining a location of a mobile device is provided. The method includes transmitting a first signal having a first spatial resolution and a second signal having a second spatial resolution from an intelligent fixture. The mobile device is configured to determine an approximate location based on at least one of the first signal and the second signal, wherein the approximate location determined from the first signal is more accurate than the approximate location determined from the second signal.

In another embodiment, another method of determining the location of the mobile device is provided. The method includes selectively coupling a transceiver to a first antenna having a first radiation pattern, transmitting a beacon signal using the first antenna, selectively coupling the transceiver to a second antenna having a second radiation pattern different from the first radiation pattern, transmitting a first communication signal using the second antenna, and receiving a second communication signal using the second antenna.

In another embodiment, an intelligent fixture is provided that includes one or more transmitters that transmit the first signal having the first spatial resolution and the second signal having the second spatial resolution. The mobile device determines the approximate location based on at least one of the first signal and the second signal, wherein the approximate location determined from the first signal is more accurate than the approximate location determined from the second signal.

In another embodiment, another method of determining the location of the mobile device is provided. The method includes receiving, at the mobile device, one or more of the first signal having the first spatial resolution, and the second signal having the second spatial resolution different from the first spatial resolution. In response to receiving the first signal, the method determines the first approximate location based on the first signal, and in response to receiving the second signal, determines the second approximate location based on the second signal.

In another embodiment, the mobile device is provided. The mobile device includes a receiver and a processor. The receiver receives one or more of the first signal having the first spatial resolution, and the second signal having the second spatial resolution different from the first spatial resolution. The processor is configured to, in response to receiving the first signal, determine the first approximate location based on the first signal, and in response to receiving the second signal, determine the second approximate location based on the second signal.

In another embodiment, a computer program product for determining the location of the mobile device is provided. The computer program product includes a non-transitory computer-readable storage medium, and program code stored on the non-transitory computer-readable storage medium. The program code is configured to, when executed by one or more processors of the intelligent fixture, cause the intelligent fixture to transmit the first signal having the first spatial resolution and the second signal having the second spatial resolution. The mobile device is configured to determine the approximate location based on the at least one of the first signal and the second signal, wherein the approximate location determined from the first signal is more accurate than the approximate location determined from the second signal.

In another embodiment, another computer program product for determining the location of the mobile device is provided. The computer program product includes the non-transitory computer-readable storage medium, and program code stored on the non-transitory computer-readable storage medium. The program code is configured to, when executed by the one or more processors of the intelligent fixture, cause the intelligent fixture to selectively couple the transceiver to the first antenna having the first radiation pattern, transmit the beacon signal using the first antenna, selectively couple the transceiver to the second antenna having the second radiation pattern different from the first radiation pattern, transmit the first communication signal using the second antenna, and receive the second communication signal using the second antenna.

In another embodiment, another computer program product for determining the location of the mobile device is provided. The computer program product includes the non-transitory computer-readable storage medium, and program code stored on the non-transitory computer-readable storage medium. The program code is configured to, when executed by one or more processors of the mobile device, cause the mobile device to receive, from the single anchor node of the positioning system, one or more of the first signal having the first spatial resolution, and the second signal having the second spatial resolution different from the first spatial resolution. The program code further causes the mobile device to, in response to receiving the first signal, determine the first approximate location based on the first signal, and in response to receiving the second signal, determine the second approximate location based on the second signal.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention provide systems, methods, and computer program products for accurately determining a location of a mobile device, and for communicating location-specific information to the mobile device. The disclosed embodiments may also provide for efficient indoor positioning, customer tracking, proximity marketing, lighting control, and building management.

Figure 1:
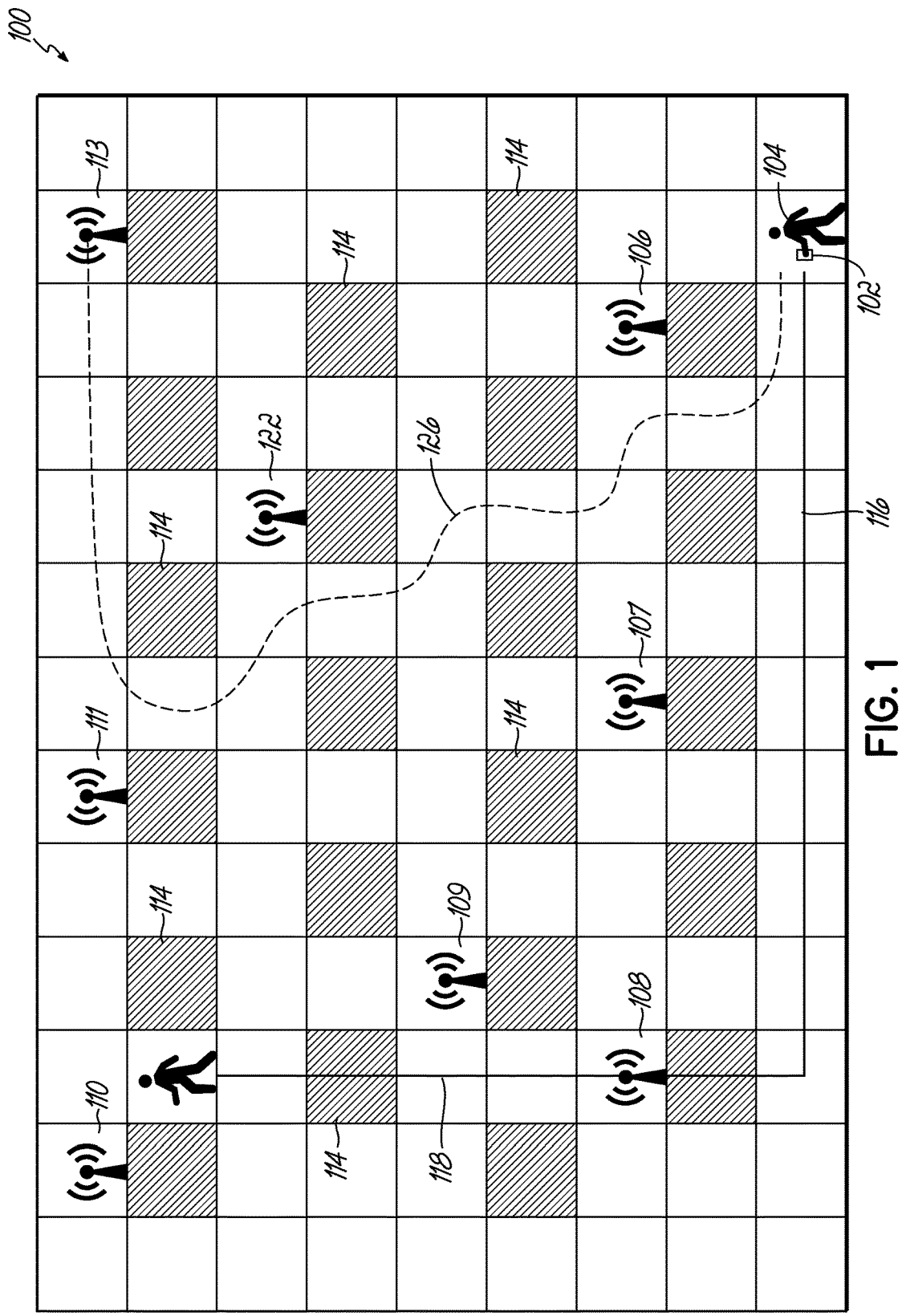
FIG. 1 is a diagrammatic view of a system including a plurality of intelligent fixtures that interact with a mobile computing device.

FIG. 1 depicts an exemplary operating environment 100 in accordance with an embodiment of the invention. The operating environment 100 includes a mobile device 102, which may be carried by a person 104, and a plurality of intelligent fixtures 106-113. Each of the intelligent fixtures 106-113 may include one or more beacons that transmit beacon signals at certain intervals so as to provide an anchor node for a positioning system. These signals may in turn be received by the mobile device 102. The operating environment 100 may also include additional fixtures 114 that do not necessarily include all of the features of the intelligent fixtures 106-113. In an embodiment of the invention, the fixtures 106-114 may comprise light fixtures, e.g., a 2 by 2 LED Troffer light fixture.

The mobile device 102 may be a smart phone, tablet computer, or other portable computing device. The beacon may comprise a Bluetooth™ beacon. Bluetooth beacons and chipsets may be obtained from Estimote, Inc. of New York City, Kontakt.io, Inc. of New York City, Silicon Labs of Austin, Tex., or Nordic Semiconductor ASA of Oslo, Norway, for example. Bluetooth beacon signals may be received by the mobile device 102 when the mobile device 102 is in close proximity to the beacon. According to an embodiment of the invention, the beacon may operate using Bluetooth™ low-energy (BLE) technology. Compared to regular Bluetooth technology, BLE consumes less power, has a shorter range, and transmits less data. Thus, BLE is designed for periodic transfers of relatively small amounts of data as compared to Bluetooth.

Intelligent fixture 106 may transmit advertising packets that are received by the mobile device 102. The advertising packets may be formatted according to a protocol that includes an identifier unique to the transmitting beacon. One such protocol is the iBeacon protocol, which is an implementation of BLE technology available from Apple, Inc. of Cupertino Calif. Advertising packets using the iBeacon protocol may include a Universally Unique Identifier (UUID), Major and Minor parameters, and a TX power parameter. The Major parameter may be a 2 byte string used to identify a subset of beacons within a larger group, and the Minor parameter may be a 2 byte string that identifies individual beacons within the subset.

The TX power parameter may indicate the power at which the signal is transmitted by the beacon. The measured power received by the mobile device 102 may be quantified by a parameter called a Received Signal Strength Indicator (RSSI). RSSI is a measurement of the power present in a received radio signal. RSSI depends at least in part on the transmitted power of the received signal and the distance between the intelligent fixture 106 and the mobile device 102. The mobile device 102 may determine an estimated distance to the intelligent fixture 106 by comparing the RSSI with the transmitted power indicated by the TX power parameter to determine a relative signal strength or path loss.

Generally, the transmission range of a beacon may be adjusted to different levels each corresponding to a different value of the TX power parameter. For example, in a typical operating environment, a beacon transmission power of −30 dBm may result in an RSSI of roughly −115 dBm at a distance of one meter. A beacon transmitting at this power level may have a range of roughly 2 meters. In a further example, a beacon transmitting at a power of −20 dBm may result in an RSSI of roughly −105 dBm at a distance of one meter. A beacon transmitting at this power level may have a range of roughly 4 meters. In general, beacons transmitted at higher power levels can be received at a greater range. Thus, beacons transmitting at −16 dBm, −12 dBm, and −8 dBm may have ranges of roughly 10, 20, and 30 meters, respectively.

The mobile device 102 may determine location specific information based on one or more of the received UUID, Major parameter, Minor parameter, and TX power parameter. For example, the UUID, Major parameter, and Minor parameter may be used to uniquely identify a particular transmitting beacon. Thus, the physical location of the beacon may be determined by the mobile device 102 based on the UUID, Major parameter, and Minor parameter. To this end, location information associated with a group of beacons may be stored in a lookup table or database in the mobile device 102. The information in the lookup table may be indexed by the UUID, Major parameter, and Minor parameter. The location information may also be stored on a server or "in the cloud", and may be accessible to the mobile device 102 over a network.

In another embodiment, the beacon may transmit advertising packets that are formatted according to the Eddystone protocol, which is available from Google Inc. of Mountain View, Calif. Packets using the Eddystone protocol may include the Eddystone-UID, Eddystone-URL, Eddystone-TLM, and Eddystone-EID parameters. The Eddystone-UID contains a static unique identifier for the beacon, which may be similar to the UUID, Major parameter, and Minor parameter of the iBeacon protocol. The Eddystone-URL is a compressed Universal Record Locator (URL) that, once parsed and decompressed, may be directly usable by the mobile device 102. For example, the mobile device 102 may communicate with a server on the cloud to retrieve information based on the Eddystone-URL. The Eddystone-TLM parameter may provide telemetry data that indicates an internal state of the beacon. For example, the Eddystone-TLM may include information regarding a battery voltage of the beacon, a temperature of the beacon, a number of advertising frames sent by the beacon, and time since the beacon was last rebooted.

The Eddystone-EID (Ephemeral Identifier) is an identifier that changes every few minutes. The Eddystone-EID may be used to improve security by helping to prevent spoofing, malicious asset tracking, replay attacks, and other forms of impermissible access. The Eddystone-EID can be resolved to give useful information by using a service (such as the Google Proximity Beacon API) that shares a key with the individual beacon.

In another embodiment, the beacon may transmit advertising packets that are formatted according to the AltBeacon™ protocol, which is available from Radius Networks of Washington, D.C. The AltBeacon protocol allows for application-specific, rather than company-specific, UUIDs. AltBeacon is an open source beacon protocol that was designed to overcome issues associated with protocols that favor one vendor over another.

The above description illustrates a number of ways in which the intelligent fixture 106 may provide uni-direction communication to the mobile device 102 through the use of beacons. However, it should be understood that the above described beacons are for exemplary purposes only, and other suitable beacon protocols may be used. Thus, embodiments of the invention are not limited to the above described beacon protocols.

The mobile device 102 may use information obtained from the intelligent fixture 106 via the beacon signal to determine or retrieve location specific information. For example, in a retail environment, the intelligent fixture 106 may provide information relevant to items displayed near the intelligent fixture 106. A product displayed in the vicinity of the intelligent fixture 106 may have an associated coupon or other related discount or promotional program. The mobile device 102 may use information obtained from the intelligent fixture 106 to retrieve a coupon associated with the related product. By way of example, the mobile device 102 may use information obtained from the intelligent fixture 106 in a museum to retrieve additional content related to museum pieces displayed near the intelligent fixture 106. The mobile device 102 may also be used to update inventory information for a store, warehouse, hospital, etc., based on signals received from one or more intelligent fixtures 106.

In addition to providing uni-direction communication to the mobile device 102 through the use of beacons, the intelligent fixture 106 may further transmit a communication signal to the mobile device 102 and receive corresponding communication signals from the mobile device 102 in order to establish bi-directional communication. To this end, the intelligent fixture 106 may provide bi-directional communication according the Bluetooth Smart™ protocol, which the mobile device 102 may use to receive signals from and transmit signals to the intelligent fixture 106.

Bluetooth Smart and Bluetooth Smart Ready devices may operate according to the Bluetooth 4.0 standard (and later versions). These versions of Bluetooth address problems associated with previous versions of Bluetooth related to battery drain and the need to constantly pair and re-pair connected devices, and do not rely on a constant stream of information being transferred between paired devices. Rather, these versions of Bluetooth allow paired devices to communicate intermittently and the connection to sleep during periods of non-use. This may reduce energy consumption so that battery operated devices run longer before requiring charging. With previous versions of Bluetooth, it was advisable to shut off hardware that was not in use. Starting with Bluetooth 4.0, some devices may run for 1 and 2 years on battery power, according to estimates from the Bluetooth Special Interest Group.

Bluetooth Smart Ready devices may be devices such as smart phones, notebooks, and tablet computers that can receive and share Bluetooth signals from external devices such as speakers, headphones, various sensors, etc. Such peripheral devices may connect with and exchange information with Bluetooth Smart Ready devices according to the Bluetooth Smart protocol.

In some instances, the mobile device 102 and intelligent fixture 106 may use different protocols. For example, the mobile device 102 may communicate with the intelligent fixture 106 according to the Bluetooth Smart Ready protocol, while the intelligent fixture 106 may communicate with the mobile device 102 according to the Bluetooth Smart protocol. In further embodiments, other protocols may be used instead of, or in addition to, Bluetooth Smart for communication between the intelligent fixture 106 and the mobile device 102, and/or between intelligent fixtures. By way of example, suitable communication protocols commonly referred to as "Wi-Fi" that are based on the IEEE 802.11 standard may be used for communication.

With continued reference to FIG. 1, the plurality of intelligent fixtures 106-113 may be positioned within an environment that may be encountered by a mobile device 102. The intelligent fixtures 106-113 may be located in an indoor environment such as a store or warehouse. The person 104 carrying the mobile device 102 may move through the environment along a path 116. As the person moves along the path 116, they may bring the mobile device 102 within proximity of one or more of the intelligent fixtures 106-113. For example, a person moving along path 116 may first encounter intelligent fixture 106. The mobile device 102 may receive signals from the intelligent fixture 106 in a uni-directional manner, or communicate with the intelligent fixture 106 in a bi-directional manner, and may receive location dependent information from or through the intelligent fixture 106.

As the person 104 moves along the path 116, they may further come within close proximity of intelligent fixture 107. In response to coming within close proximity of intelligent fixture 107, the mobile device 102 may communicate with the intelligent fixture 107 and receive location dependent information from or through the intelligent fixture 107 in a similar manner as described above with respect to intelligent fixture 106. The mobile device 102 may determine location dependent information based on signals received from intelligent fixtures 106 and 107. For example, the mobile device 102 may determine an RSSI of the signal received from intelligent fixture 106 and an RSSI of the signal received from intelligent fixture 107. The mobile device 102 may then determine an approximate distance from intelligent fixture 106 based on the RSSI of the signal received from intelligent fixture 106, and an approximate distance from intelligent fixture 107 based on the RSSI of the signal received from intelligent fixture 107. The mobile device 102 may thereby determine an approximate location relative to intelligent fixtures 106 and 107 based on the respective RSSI values of the associated signals.

As the mobile device 102 is moved further along the path 116, the mobile device 102 may come within close proximity of intelligent fixture 108, intelligent fixture 109, and intelligent fixture 110. With each encounter, the mobile device 102 may determine its location relative to the respective intelligent fixture. In further embodiments, information related to a time dependent location of the mobile device 102 may be determined by one or more of the intelligent fixtures. For example, suppose at one time the mobile device 102 is at a position 118 along the path 116. At position 118, the mobile device 102 may be sufficiently close to two or more intelligent fixtures (e.g., intelligent fixtures 108-110) to receive corresponding signals from each of the intelligent fixtures. In the above example, the mobile device 102 may determine RSSI values associated with signals received from each of the respective intelligent fixtures 108-110. From the determined RSSI values, the mobile device 102 may determine its approximate location relative to the intelligent fixtures 108-110 using multilateration (e.g., trilateration).

In an alternative embodiment, one or more intelligent fixtures may determine RSSI values associated with signals received from the mobile device 102. For example, intelligent fixtures 108-110 may each receive a signal from the mobile device 102. One or more of the intelligent fixtures 108-110 may, in turn, compute an approximate location of the mobile device 102 based on corresponding RSSI values received by intelligent fixtures 108-110.

A person 104 carrying the mobile device 102 may move through the operating environment 100 along a path other than path 116 so that the mobile device 102 comes into close proximity with other intelligent fixtures. For example, mobile device 102 may first encounter intelligent fixture 106 (as before), but then move along path 126, thereby encountering intelligent fixture 112, followed by intelligent fixtures 111 and 113. As described above, location information may be determined by the mobile device based on RSSI values of signals received from corresponding intelligent fixtures 106, 111-113. Similarly as described above for path 116, one or more of the intelligent fixtures 106, 111-113 may determine location information related to the mobile device 102 based on RSSI values of signals received from the mobile device 102 as the mobile device 102 moves along path 126.

In the above examples, location information may be determined by either the mobile device 102 or one or more of the intelligent fixtures 106-113 based on RSSI values of received signals. Location information may also be determined by taking into account known location values of the intelligent fixtures 106-113 based on data encoded within the signals transmitted by the intelligent fixtures 106-113. For example, one or more intelligent fixtures 106-113 may transmit a unique identifier that may be used to determine location information.

By way of example, in a retail store setting, intelligent fixture 106 may be associated with particular products located near the intelligent fixture 106. Intelligent fixture 106 may transmit a UUID that can be used by the mobile device to receive location dependent information from a database. When the mobile device 102 receives the UUID from intelligent fixture 106, the mobile device 102 may use the UUID to retrieve associated information from the database. For example, the UUID may be used by the mobile device 102 to retrieve a coupon for a related product that is on display near the intelligent fixture 106. In a museum, the received UUID may be used by the mobile device 102 to retrieve related content associated with pieces displayed near the intelligent fixture 106. In a warehouse setting, the received UUID may be used to determine and update inventory information for goods stored in the warehouse.

In further examples, the mobile device 102 may communicate with one or more of the intelligent fixtures 106-113 in order to commission or configure the intelligent fixtures 106-113 and/or other systems in communication with the intelligent fixtures 106-113. For example, after installation of the intelligent fixtures 106-113, a process may be implemented in which information is transmitted from the mobile device 102 to one or more of the intelligent fixtures 106-113. Information associated with the intelligent fixtures 106-113 may also be updated periodically in this manner.

In a retail setting, various product displays may be changed from time to time. Thus, it may be advantageous to change the information associated with one or more of the intelligent fixtures 106-113. To this end, the information encoded on the intelligent fixtures 106-113, or a location associated with the encoded information by a lookup table or database, may be changed to reflect positional changes and/or changes associated with updated product placement. In order to reconfigure the intelligent fixtures 106-113, a process may be used in which information is communicated between the mobile device 102 and one or more of the intelligent fixtures 106-113. For example, the mobile device 102 may communicate individually with each of the intelligent fixtures 106-113 to provide updated information corresponding to the respective fixture.

The intelligent fixtures 106-113 may also be configured as a network with one or more of the intelligent fixtures acting as a controller for the network. For example, intelligent fixture 106 may act as a controller for a network including intelligent fixtures 106-113. In this example, the mobile device 102 may communicate information to the controller intelligent fixture 106, which may in turn communicate with the rest of the intelligent fixtures 107-113 in the network.

Conventional beacons generally operate on battery power. As such, they may suffer from limitations associated with the need to conserve battery power. One such constraint is that battery powered beacons may transmit infrequently due to power constraints. This infrequent transmission of beacon signals may lead to "dead spots" and low "time on" characteristics. Infrequent transmission of beacon signals may also increase latency, which can result in the mobile device 102 failing to properly receive information from the beacon due to motion of the mobile device. In order to overcome these problems, embodiments of the invention may power the beacons using a dedicated power source.

Figure 2:
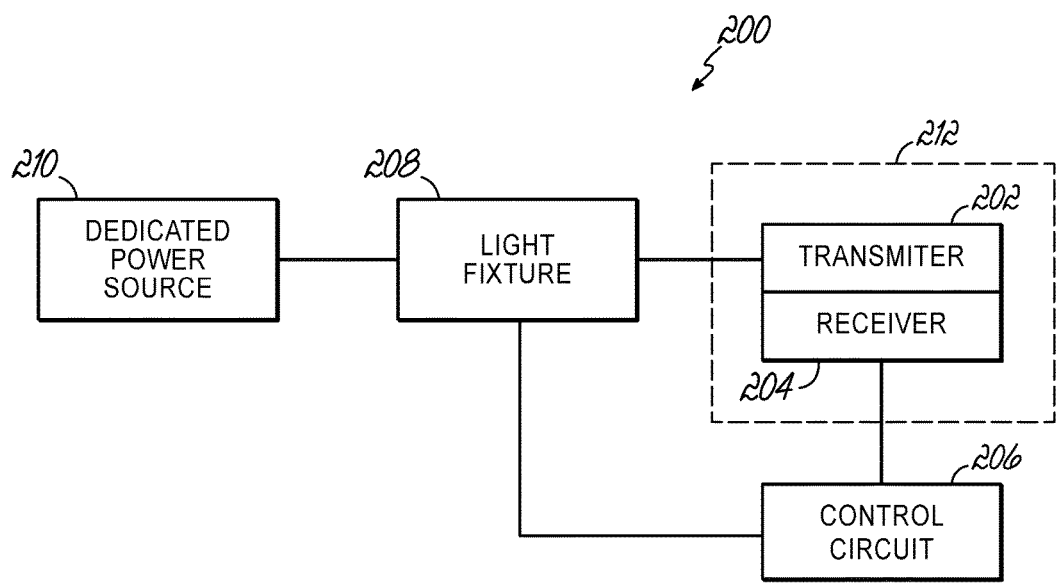
FIG. 2 is a diagrammatic view of the intelligent fixture of FIG. 1 including a transceiver and a light fixture powered by a dedicated power source.

FIG. 2 depicts an intelligent fixture 200 including a transmitter 202, a receiver 204, a control circuit 206, and a light source or light fixture 208 that are powered by a dedicated power source 210. In an embodiment of the invention, the transmitter 202 and receiver 204 may comprise a transceiver 212. The transceiver 212 may be coupled to the light fixture 208, and the light fixture 208 may be coupled to the dedicated power source 210. The dedicated power source 210 may provide electrical power to both the light fixture 208 and the transceiver 212. Advantageously, powering the transceiver 212 using the dedicated power source 210 used to power the light fixture 208 rather than a battery may enable embodiments of the present invention to avoid the problems of battery powered beacons described above. Using the dedicated power source 210 may enable the transceiver 212 to transmit and receive signals at a high rate, thereby reducing problems such as latency and dead spots as compared to beacons lacking this feature.

The control circuit 206 may be coupled to the transceiver 212 and to the light fixture 208. The control circuit 206 may have one or more processors and be configured to control the light fixture based on signals received by the transceiver 212. Processors for use in the control circuit 206 may be obtained from Nordic Semiconductor, Silicon Labs, NXP Semiconductors N.V. of Eindhoven, the Netherlands, Texas Instruments of Dallas, Tex., and STMicroelectronics of Geneva, Switzerland, for example.

The transceiver 212 may receive a signal from the mobile device 102, and based on the received signal, the control circuit 206 may turn the light fixture 208 on or off. The control circuit 206 may also be configured to change the brightness and/or the color spectrum of light emitted by the light fixture 208.

Intelligent fixture 200 may provide several advantages over conventional systems in applications related to lighting control. For example, a plurality of intelligent fixtures 200 may be employed in a retail store setting such as illustrated in FIG. 1. Considerable energy savings may be achieved if light fixtures associated with the intelligent fixtures 106-113 are controlled based on the proximity of a customer (e.g., person 104) carrying a mobile device 102. This could allow areas of a store where intelligent fixtures are not in close proximity to the mobile device 102 to be kept dim or turned off due to a lack of customers. Similarly, intelligent fixtures 106-110 along a customer's path 116 through the store may cause their corresponding light fixtures to be lit in response to the customer moving the mobile device 102 along path 116. Likewise, light fixtures associated with intelligent fixtures 106 and 111-113 may be lit as the customer moves along path 126.

Embodiments of the invention may be advantageous for various lighting management applications, such as controlling lighting characteristics in a hospital setting. For example, light fixtures in a patient's room may be configured to emit light in a first mode having a given brightness and color spectrum while the patient is awake, and the light may be chosen to have a warm color spectrum (i.e., a low Correlated Color Temperature (CCT)) and a dim brightness setting while a patient is sleeping. In response to a health care practitioner entering the room (e.g. to check the patient's vital signs or to manage operation of various pieces of equipment), the intelligent fixture 200 may change the light settings to have a different value of brightness and/or color spectrum. Using systems according to the disclosed embodiments, the lighting characteristics may be changed automatically when a health care practitioner enters the room in response to the intelligent fixture 200 recognizing the mobile device 102 carried by the practitioner.

Multiple lighting settings may be defined and may be activated based on information conveyed by the mobile device. For example, hospital staff performing one type of function (e.g., general maintenance of hospital equipment) may activate a lighting characteristic specific to that function. Similarly, a nurse or doctor entering the room to perform a health care related function may activate a different lighting characteristic based on information conveyed by their specific mobile device.

Embodiments of the invention may be integrated with other sensors to provide further functionality. For example, the intelligent fixture 200 may include, or otherwise be in communication with, temperature sensors, humidity sensors, and motion sensors. These types of sensors may be obtained from Analog Devices, Inc. of Norwood, Mass., Microchip Technology of Chandler, Ariz., Intersil Corporation of Milpitas, Calif., On Semiconductor of Phoenix, Ariz., or ams AG of Styria, Austria, or example.

One use of the sensors may be to determine the presence or absence of a person in a room. In response to a person leaving a room for a predetermined time, the intelligent fixture 200 may reduce or turn off lights. Motion detection sensors may thereby allow for more efficient lighting control. Temperature and humidity sensors may also be used with the intelligent fixture 200 to enable more efficient building management by providing location specific information to the building Heating Ventilation and Air-Conditioning (HVAC) system. HVAC control may also be used in conjunction with information regarding the presence or absence of persons in rooms to adjust the temperature in rooms based on occupancy.

Further applications of the invention may include positioning and tracking of vehicles (e.g., forklifts) as well as efficient area and pathway lighting in warehouses or other storage facilities. A mobile device coupled with a network of intelligent fixtures may improve efficiency of inventory tracking, enable tracking of staff and visitors in hospitals, and enable efficient "wayfinding" for customers in large unfamiliar buildings. For example, a person may be conveniently and efficiently guided along a path to a desired destination in an airport through interaction between their mobile device and a plurality of intelligent fixtures. That is, a customer may be guided along path 116 or 126 to an airport gate based on interaction with intelligent fixtures 106-110 in one case, and by interaction with intelligent fixtures 106, and 111-113 in the other case.

Embodiments of the invention may also be employed in outdoor environments, such as in automobile service stations. Outdoor lighting fixtures may be controlled to change their color or brightness due to the presence or absence of a customer carrying an appropriately configured mobile device. Further, as in the above-discussed retail applications, various marketing and promotional offers may be provided to a customer through interaction of the mobile device with one or more intelligent fixtures.

Embodiments of the invention may also be employed to provide efficient control of outdoor pathway light fixtures. As with the above indoor lighting examples, outdoor path lighting may be controlled to change brightness and/or color depending on the presence, absence, or motion of an appropriately configured mobile device through an area in which intelligent fixtures are deployed. As with the above-described indoor systems, the mobile device may interact individually with various deployed intelligent fixtures that operate separately from one another, or the mobile device may interact with an intelligent fixture that operates as a control device for a plurality of intelligent fixtures configured to operate as a network.

Figure 3:
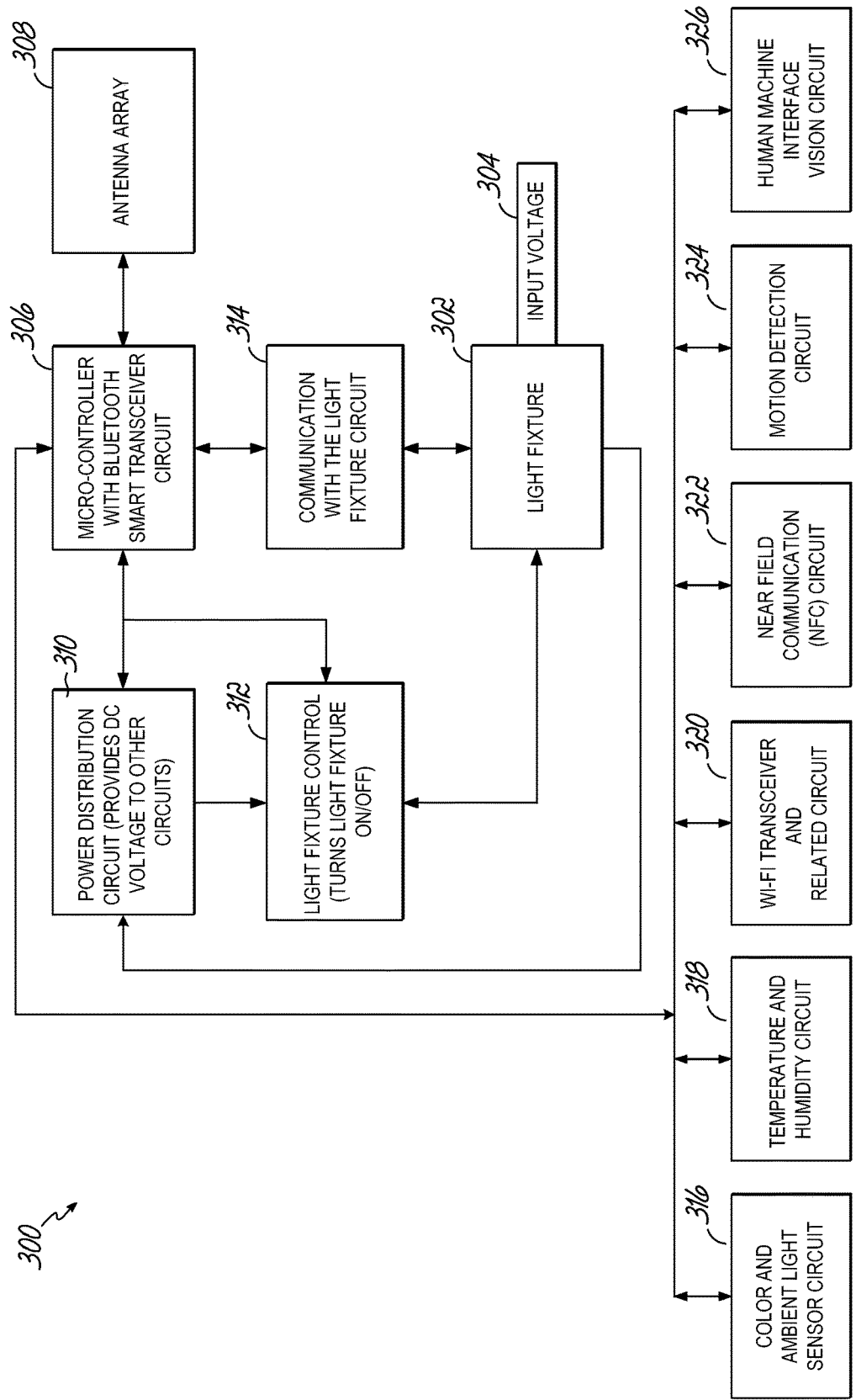
FIG. 3 is a diagrammatic view of the intelligent fixture of FIG. 1 in an alternative embodiment of the invention showing an antenna array and a plurality of sensors.

FIG. 3 depicts a block diagram of an intelligent fixture 300 consistent with an embodiment of the invention. The intelligent fixture 300 includes a light fixture 302, such as a light fixture from LSI Industries, Inc. of Cincinnati, Ohio. The light fixture 302 is coupled to a dedicated power supply 304 which supplies a predetermined input voltage to the light fixture 302, such as 120 or 240 volt Alternating Current (AC) from the power grid. The intelligent fixture 300 further includes a control circuit 306 having an integrated transceiver that is selectively coupled to one or more antennas, such as antenna 308. The antenna 308 may include a plurality of antennas that function as an antenna array. The control circuit 306 may include a microcontroller configured to receive and transmit information according to the Bluetooth Smart™ protocol using the antenna 308. The intelligent fixture 300 may further include a power distribution circuit 310 that provides power to other circuits within the intelligent fixture 300 in the form of one or more Direct Current (DC) voltages. The intelligent fixture 300 may further include a light fixture control circuit 312 and a communication circuit 314 that controls the light fixture 302. Circuits 312 and 314 may be configured, for example, to control the output (e.g., color spectrum and brightness) of the light fixture 302.

The intelligent fixture 300 may also include one or more of a light sensor circuit 316 configured to measure color and/or brightness (i.e., intensity) of ambient light, a temperature and humidity circuit 318, a Wi-Fi transceiver circuit 320, a Near-Field Communication (NFC) circuit 322, a motion detection circuit 324, and a Human Machine Interface (HMI) vision circuit. The light sensor, humidity, and motion detection circuits may be obtained from Analog Devices, Microchip Technology, Intersil, On Semiconductor, or ams AG; the Wi-Fi transceiver circuit may be obtained from Microchip Technology; the NFC circuit may be obtained from Nordic Semiconductor ASA; and the HMI vision circuit may be obtained from OmniVision Technologies Inc. of Santa Clara, Calif., for example. The NFC circuit 322 may enable the exchange of information between mobile devices and the intelligent fixture 300 using near field technology. The motion detection circuit 324 may be configured to detect motion, and the HMI vision circuit 326 may include input and output devices for interaction with a user, as well as a camera or other circuitry for machine vision.

Figure 4:
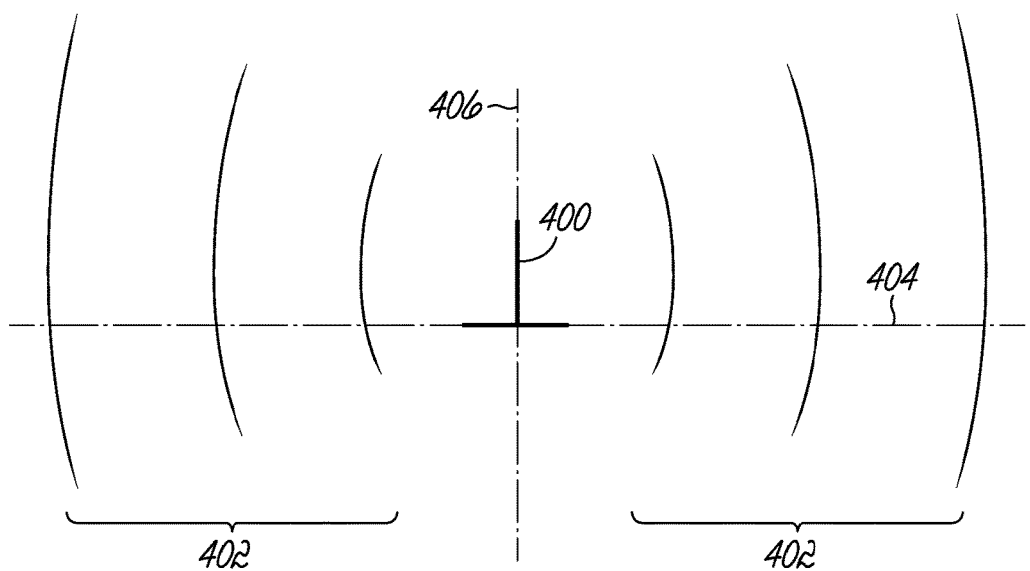
FIG. 4 is a diagrammatic view illustrating one type of antenna that may be employed in the intelligent fixture of FIGS. 2 and 3.

FIG. 4 illustrates one type of antenna 400 that may be used in an embodiment of the invention. Antenna 400 has a radiation pattern 402 that is uniformly distributed symmetrically in a horizontal plane 404 bisecting the antenna 400, which is referred to as an omni-directional radiation pattern. Antenna 400 radiates a generally equal amount of power in all horizontal directions, with decreasing intensity away from the horizontal plane 404. The radiation pattern of antenna 400 in three dimensions may have a toroidal shape that is symmetric about the axis 406 of antenna 400. This type of radiation pattern may be provided by a vertically oriented monopole or dipole antenna, for example. Antennas with radiation patterns that are symmetrical in a plane of interest (e.g., the horizontal plane) are commonly referred to as omni-directional antennas to reflect that the antenna radiates in all directions symmetrically with respect to the axis 406 of the antenna 400. In an embodiment of the invention, antenna 400 may comprise a patch antenna, which is a type of low-profile radio antenna that can be defined on a circuit board.

Figure 5:
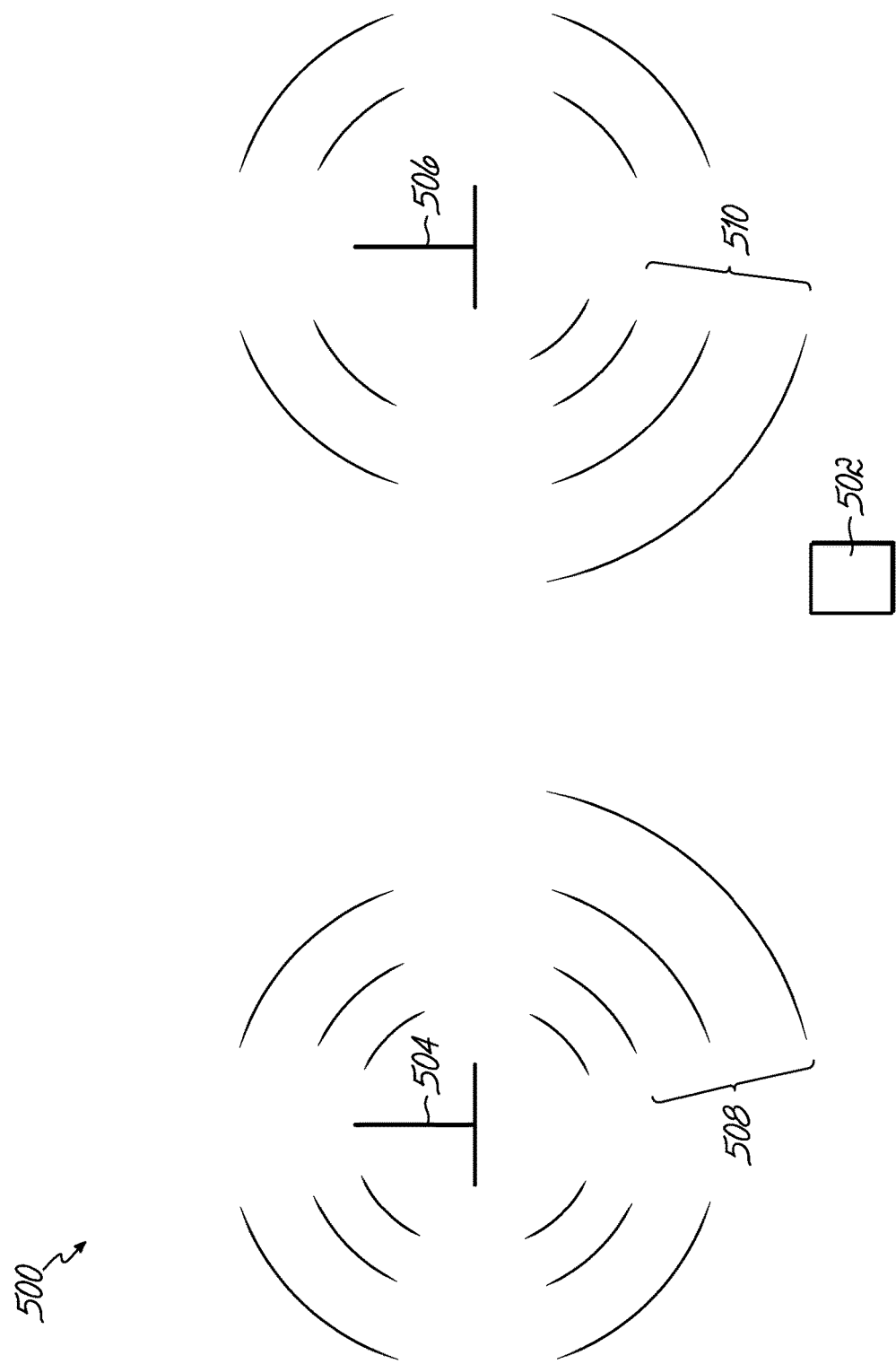
FIG. 5 is a diagrammatic view illustrating a plurality of beacons that employ the antenna of FIG. 4.

FIG. 5 illustrates a network 500 of beacons that employ omni-directional antennas, such as the antenna of FIG. 4. In this network 500, a mobile device 502 may receive signals from multiple (e.g., two) antennas 504, 506. This situation may result because the radiation patterns 508, 510 produced by the antennas 504, 506 overlap. Overlapping radiation patterns from multiple beacons may make determining location difficult. For example, in proximity marketing applications using beacons, it is often desirable for a mobile device to receive signals from a single beacon that is closest to the device to avoid confusion. A customer standing next to product A generally wants to receive information only related to product A and not from product B that may be across the store.

Figure 6:
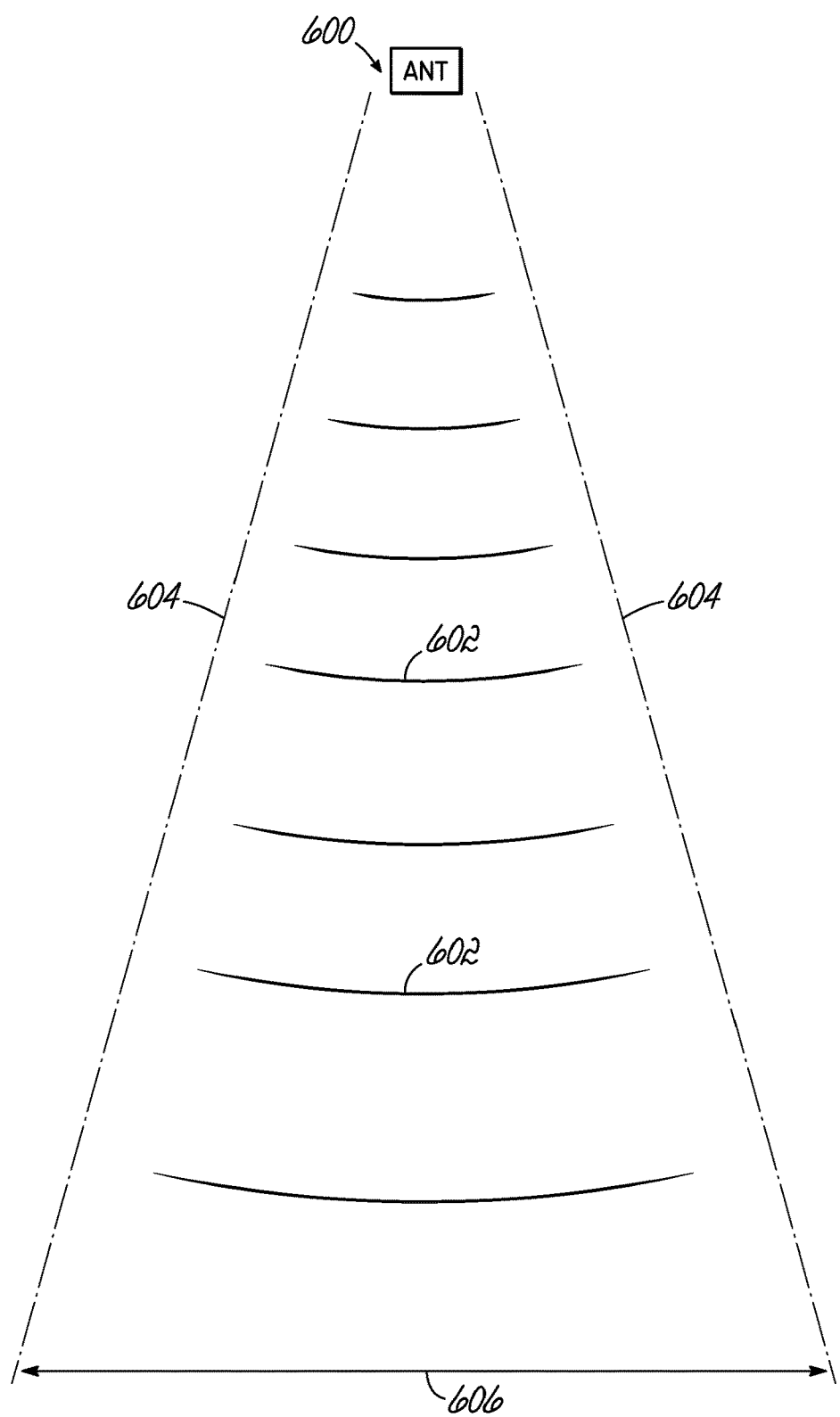
FIG. 6 is a diagrammatic view illustrating an antenna having a directional radiation pattern.

FIG. 6 illustrates an antenna 600 having a directional radiation pattern 602. The directional radiation pattern 602 may be confined to a localized region bounded by a three-dimensional cone 604 or other shape. An intelligent fixture having a directional antenna 600 oriented in a generally downward direction may be deployed in an overhead location (e.g., on the ceiling) of an enclosed space, such as in a store or warehouse. This type of deployment may produce a well defined coverage area 606 below the intelligent fixture where the beacon signal transmitted by the fixture dominates the signals transmitted by adjacent fixtures. This coverage area 606 may enable a mobile device to more accurately determine its location due to a reduced amount of overlap between the coverage areas produced by the directional radiation patterns of other intelligent fixtures.

An omni-directional antenna may be modified to operate as a directional antenna, for example, by positioning a directing element (e.g., a dielectric lens) or a reflecting element (e.g., a conductive metal element) in proximity to the radiating element of what would otherwise be an omni-directional antenna. An antenna or "antenna array" comprising a plurality of elements configured to be selectively coupled to the transceiver may be used to provide omni-directional and/or directional radiation patterns with adjustable spatial extents. This adjustability may be used, for example, to dynamically reduce, enlarge, or otherwise alter the coverage area of the antenna to further narrow the location of the mobile device and/or locate a mobile device with which communication has been lost.

Figure 7:
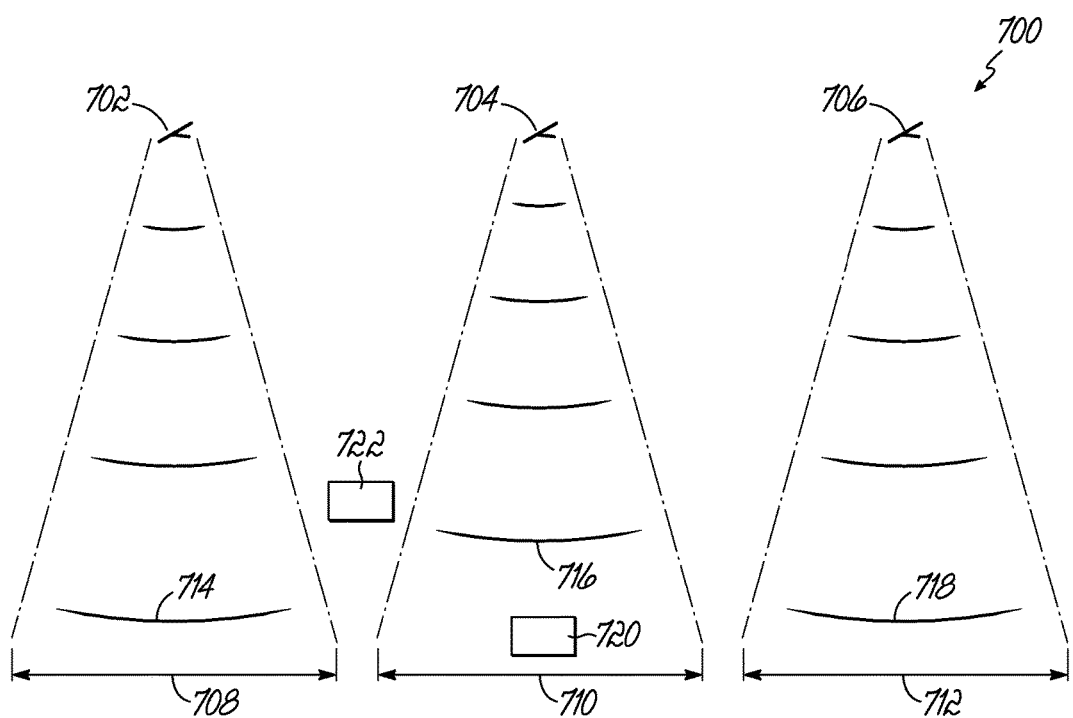
FIG. 7 is a diagrammatic view illustrating a plurality of intelligent fixtures that each include the directional antenna of FIG. 6.

FIG. 7 illustrates a plurality of intelligent fixtures 702, 704, and 706 each including directional antennas. In the example depicted, each of the intelligent fixtures 702, 704, 706 produces a corresponding localized coverage area 708, 710, 712. Each localized coverage area 708, 710, 712 may comprise a region of a floor below the corresponding intelligent fixture 702, 704, 706. Each coverage area 708, 710, 712 may be produced by a corresponding downward directed beam or directional radiation pattern 714, 716, 718. A mobile device 720 that is within the coverage area 710 of intelligent fixture 704 may only be able to communicate with intelligent fixture 704. This may be due to the radiation patterns 714, 718 from the neighboring intelligent fixtures 702, 706 having negligible signal strength at the location of mobile device 720 as compared to the strength of the signal received from intelligent fixture 704.

In this situation, the location of mobile device 720 may be determined to lie within the coverage area 710 defined by the known spatial extent of the directional radiation pattern 716 transmitted by the intelligent fixture 704. In contrast, mobile device 722 is located in a region outside any of the coverage provided by directional radiation patterns 714, 716, 718 of intelligent fixtures 702, 704, and 706. That is, mobile device 722 may be located outside the coverage areas 708, 710, 712 of intelligent fixtures 702, 704, 706. Thus, the mobile device 722 may be unable to reliably send and/or receive signals from the intelligent fixtures 702, 704, 706. As a result, the mobile device 722 may be invisible to the intelligent fixtures 702, 704, 706. A location where a mobile device has difficulty receiving or transmitting signals to an intelligent fixture may be referred to as a "dead zone".

Figure 8:
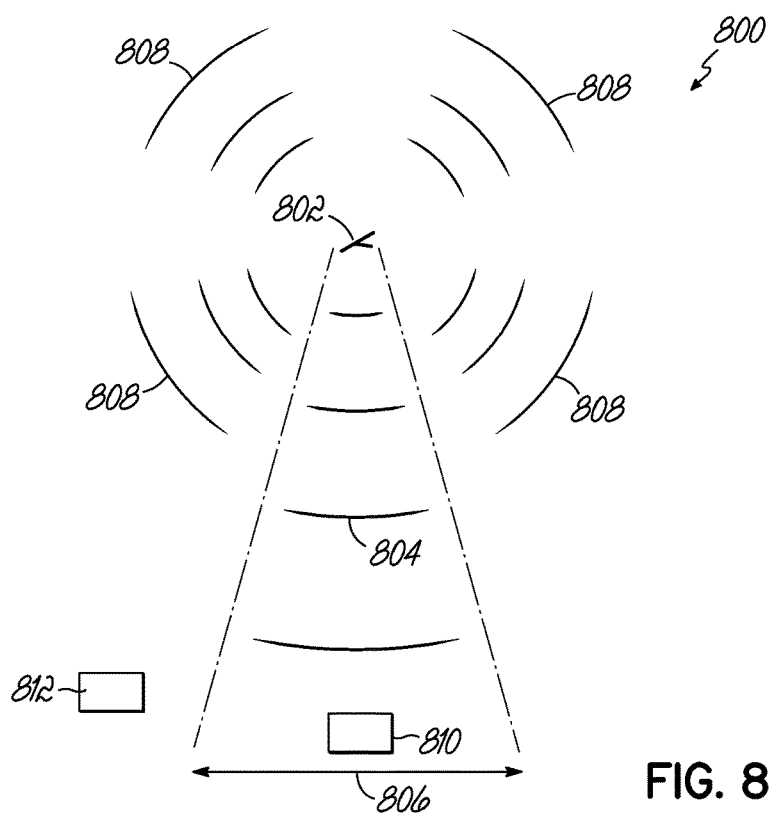
FIG. 8 is a diagrammatic view illustrating an intelligent fixture including the omni-directional antenna of FIG. 4 and the directional antenna of FIG. 5.

FIG. 8 illustrates a system 800 that may provide high accuracy spatial information regarding the location of a mobile device while avoiding dead spots. In the depicted embodiment, intelligent fixture 802 may employ an antenna system that is configured to produce both a directional radiation pattern 804 which confines the beacon signal to a localized coverage area 806 located below the intelligent fixture 802, and an omni-directional radiation pattern 808 that provides broader coverage area around the intelligent fixture 802. A mobile device 810 may receive signals transmitted using the directional radiation pattern 804 and/or signals transmitted using the omni-directional radiation pattern 808, depending on the location of the mobile device 810 and the transmission mode of the intelligent fixture 802.

The location of the mobile device 810 may be determined based on the mobile device 810 being located within the coverage area 806 produced by the known spatial extent of the directional radiation pattern 804. In this situation, a mobile device 812 lying outside of the localized coverage area 806 produced by directional radiation pattern 804 of intelligent fixture 802 would no longer lie in a dead zone. Rather, the presence of the mobile device 812 could be determined based on signals received from and/or transmitted to the mobile device 812 using the omni-directional antenna. That is, the omni-directional radiation pattern may fill in dead zones that would otherwise be present between the coverage area 806 and coverage areas of neighboring intelligent fixtures.

Thus, by combining the directional radiation pattern 804 with the omni-directional radiation pattern 808, high accuracy may be achieved in determining the location of a mobile device in the localized coverage area 806 while avoiding dead zones. A mobile device 812 that receives only the signal transmitted by the omni-directional radiation pattern 808 may determine its location at one level of accuracy. This level of accuracy may provide an approximate location of the mobile device 812 in that the mobile device 812 is known to be in the general proximity of intelligent fixture 802. Mobile device 810, which receives the signal transmitted with the directional radiation pattern 804 and/or the signal transmitted with the omni-directional radiation pattern 808, may determine its location at another level of accuracy. This level of accuracy may be higher than that determined solely from the omni-directional radiation pattern 808 because the mobile device 810 can be determined to be within the localized coverage area 806. Thus, signals transmitted with the directional radiation pattern 804 may be considered as having one spatial resolution, and signals transmitted with the omni-directional radiation pattern 808 (or a directional radiation pattern that produces a broader coverage area than directional radiation pattern 804) may be considered as having another, less accurate, spatial resolution.

The intelligent fixture 802 may be configured to operate in different modes. In one mode, the intelligent fixture 802 may transmit beacon signals using the directional antenna (e.g., to enable mobile devices to determine their location) and communication signals using the omni-directional antenna (e.g., to enable network communication between intelligent fixtures). In another mode of operation, the intelligent fixture 802 may transmit beacon signals using only the omni-directional antenna. This mode may be employed, for example, to find a mobile device that has entered a dead zone. In another mode, the intelligent fixture 802 may transmit beacon signals using both the directional and omni-directional antennas. In this mode, the frequency and/or UUID of the beacon signal transmitted by the directional antenna may be different than the frequency and/or UUID of the beacon being transmitted using the omni-directional antenna to facilitate distinguishing between the two signals. In yet another mode, communication signals may be transmitted using the directional antenna, e.g., for bi-directional communication with a mobile device known to be in the localized coverage area 806.

The intelligent fixture may use Bluetooth and/or Wi-Fi "packet sniffing" to detect the presence and/or determine the location of a mobile device by analyzing traffic transmitted from and/or to the mobile device. For example, detection of Wi-Fi and/or Bluetooth packets transmitted from the mobile device using the omni-directional antenna could be used to determine that a mobile device has entered the enclosed space occupied by the intelligent fixture. This information could then be shared with other intelligent fixtures on the network. In response, these additional intelligent fixtures could sniff for Wi-Fi and/or Bluetooth packets from the mobile device using their directional and/or omni-directional antennas to accurately determine the location of the mobile device within the enclosed space.

Figure 9:
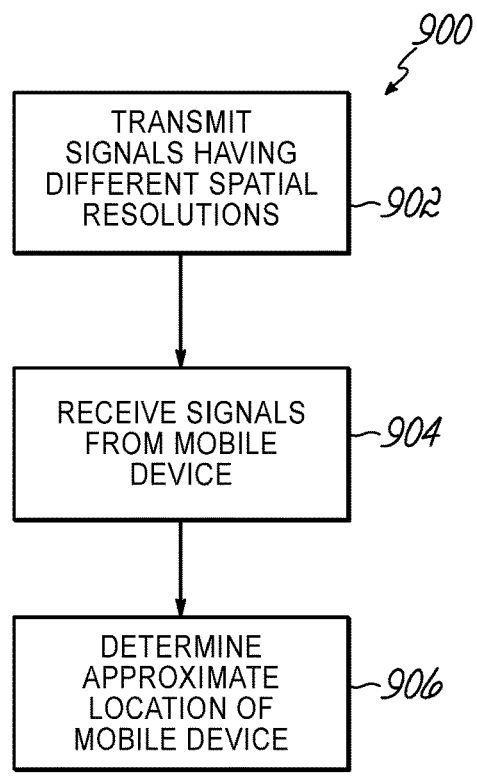
FIG. 9 is a flow chart illustrating a process for determining the location of a mobile device.

FIG. 9 depicts a flow chart illustrating a process 900 of determining the location of a mobile device that may be executed by one or more computing devices, such as the mobile device 102, control circuit 206, and/or an external computing system. In block 902, an intelligent fixture transmits signals having different spatial resolutions. For example, a low spatial resolution signal may have a spatial resolution that corresponds to a radiation pattern with a relatively broad spatial extent, such as the omni-directional radiation pattern 808. A high spatial resolution signal may have a spatial resolution that corresponds to a radiation pattern having a localized spatial extent, such as the directional radiation pattern 804. The high spatial resolution and low spatial resolution radiation patterns may be produced by a single antenna array or by separate antennas that each produce one of the radiation patterns.

In block 904, the process 900 may receive one or more signals transmitted by the mobile device. The signals may be received at a wireless network access point, and/or by one or more intelligent fixtures. These signals may be transmitted in response to the mobile device receiving one or more of the high spatial resolution and/or low spatial resolution signals. The signals received from the mobile device may be, for example, one or more data packets transmitted to a server or other network node by the mobile device, e.g., to request data associated with the UUID of a beacon signal.

In block 906, the process 900 determines, for each of the one or more signals received by from the mobile device, an approximate location of the mobile device based on the respective received signal. As described above with respect to FIG. 8, an approximation based on the high spatial resolution signal may be more accurate than an approximation based on the low spatial resolution signal. When the signal(s) received from the mobile device indicate that the mobile device has only received the low spatial resolution signal, it may be determined that the mobile device is not located within the spatial extent of the high spatial resolution radiation pattern of the intelligent fixture. In response to determining that the mobile device is only receiving low spatial resolution signals, the process 900 may collect data from a plurality of intelligent fixtures and determine the location of the mobile device based on multilateration of the signals received from the mobile device.

Figure 10:
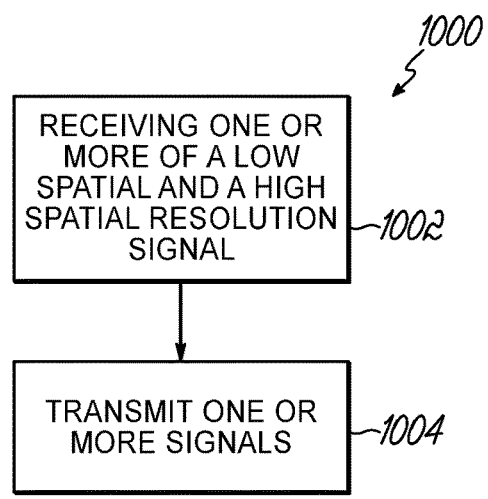
FIG. 10 is a flowchart illustrating a process for communicating with a mobile device to provide location information of the mobile device to one or more intelligent fixtures.

FIG. 10 depicts a flowchart illustrating a process 1000 that may be executed by the mobile device to provide location information to one or more intelligent fixtures. In block 1002, the process 1000 may receive one or more of a low spatial resolution signal and a high spatial resolution signal. These signals may be received, for example, by the mobile device. The low spatial resolution signal may correspond to a radiation pattern having a broad spatial extent, and the high spatial resolution signal may correspond to a radiation pattern having a localized spatial extent.

In block 1004, the process 1000 may transmit one or more signals in response to receiving the low spatial resolution signal and/or the high spatial resolution signal. The one or more signals transmitted by the mobile device may provide information regarding the location of the mobile device. For example, the signals may provide location information to the intelligent fixture indicating a level of spatial resolution of the signals received by the mobile device. This indication may be provided, for example, by a unique identifier embedded in each of the high and low spatial resolution signals. The information provided by the signals may allow the intelligent fixture, mobile device, or other computing device, to determine the location of the mobile device.

Figure 11A:
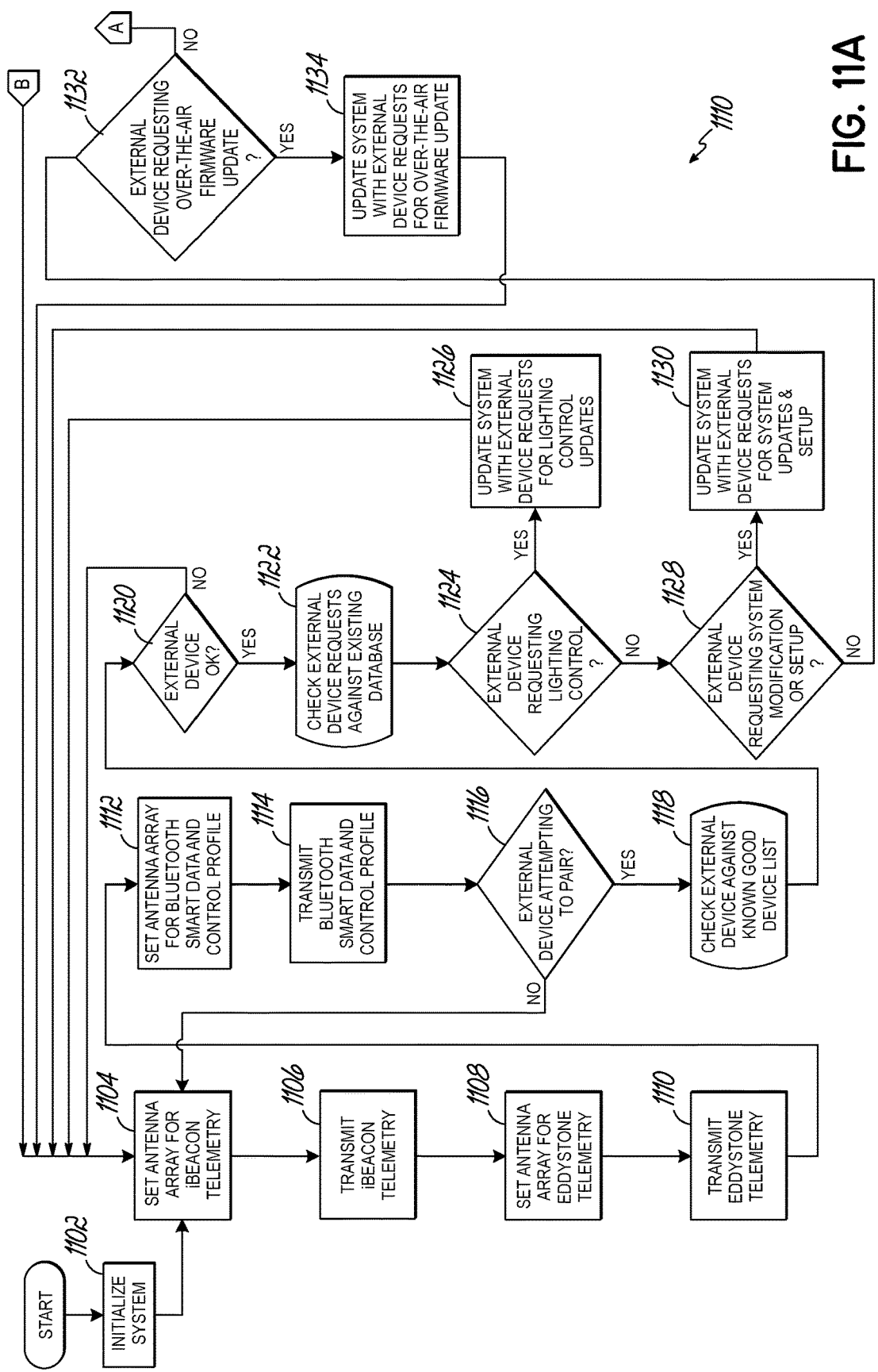
FIGS. 11A and 11B provide a flow chart illustrating a process for controlling a system that includes a mobile device and one or more intelligent fixtures.
Figure 11B:
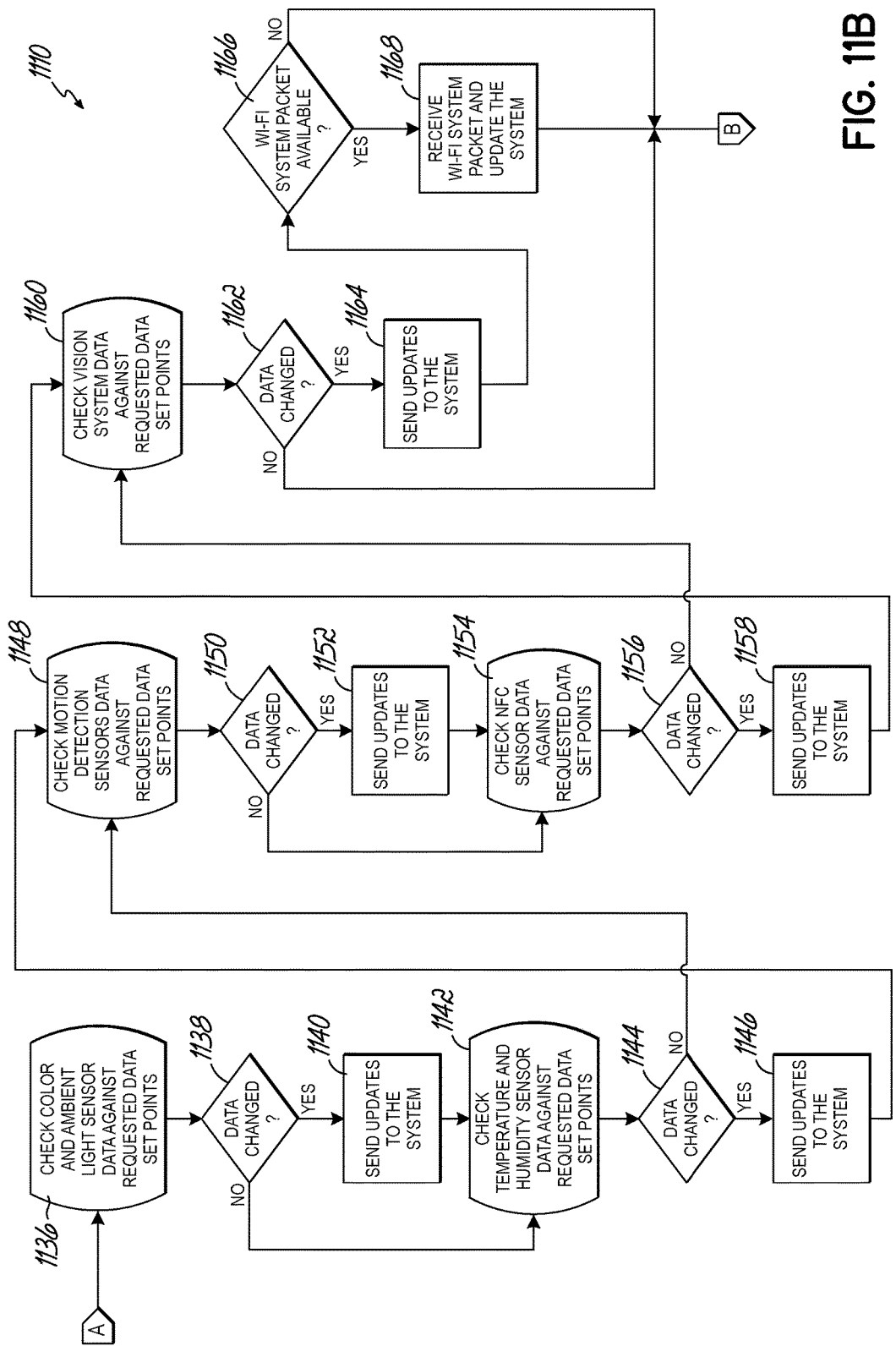

FIGS. 11A and 11B depict a flow chart illustrating a process 1100 of controlling a system that includes a mobile device and one or more intelligent fixtures. The one or more intelligent fixtures may include a reconfigurable antenna, such as an antenna array that can be dynamically configured to transmit signals having different radiation patterns, e.g., an omni-directional radiation pattern or one or more directional radiation patterns. In block 1102, the process 1100 may initialize the system. To this end, the mobile device may communicate directly with one or more of the intelligent fixtures to provide initialization parameters. The mobile device may transmit the initialization parameters to each intelligent fixture directly, for example, for systems in which the intelligent fixtures do not communicate with one another. In other embodiments, the mobile device may communicate with one or more intelligent fixtures that are configured to act as control devices for a network of intelligent fixtures. In a networked configuration, the networked intelligent fixtures may communicate among themselves using omni-directional signals.

The ability to transmit both high spatial resolution and low spatial resolution signals may enable the intelligent fixtures to communicate with each other without compromising the spatial resolution of signals used to locate mobile devices. That is, the low spatial resolution signals (which may provide coverage that overlaps other intelligent fixtures) may be used for inter-fixture communication. This may allow the high spatial resolution signals to be optimized for determining the location of mobile devices without concern for inter-fixture communication. This, in turn, may allow the high-resolution signals to be configured so that they are confined to localized coverage areas that do not overlap those of other intelligent fixtures, or that overlap those of other intelligent fixtures in a controlled manner.

In block 1104, the process 1100 may configure the antenna array on one or more intelligent fixtures to transmit telemetry having one type of protocol (e.g., iBeacon telemetry data) using signals having a directional radiation pattern. The process 1100 may then proceed to block 1106, and transmit telemetry data according to the selected format. The telemetry data may be configured to be received and processed by a mobile device configured to receive and process data in the selected format. The telemetry data may include a reference RSSI value associated with the signal strength at a fixed distance (e.g., one meter) from the intelligent fixture that is transmitting the data. This reference RSSI value may be used to determine distance by comparing the reference RSSI value to the RSSI of the signal received by the mobile device.

In block 1108, the process 1100 may reconfigure the antenna array of one or more intelligent fixtures to transmit another type of telemetry data (e.g., Eddystone telemetry data) using signals having a directional radiation pattern. The process 1100 may then proceed to 1110 and transmit telemetry data according to the selected format. The telemetry data may be configured to be received and processed by a mobile device configured to receive and process data in the selected format. For Eddystone data, the device may be a smart phone running the Android™ operating system. The telemetry data transmitted in block 1110 may include an RSSI value associated with the signal strength of the intelligent fixture that is transmitting the data in a manner similar to that described above with respect to the previously selected telemetry signal.

The process 1100 may periodically switch between transmitting data in one format (e.g., the iBeacon format) to transmitting data in the other format (e.g., the Eddystone format), or any other suitable data format, during a short time scale. For example, the intelligent fixture may transmit one or more beacon advertising packets in one format over a 20 millisecond period, and then switch to another format for the next transmission interval. Other time intervals may also be used, such as 1 millisecond, 5 milliseconds, 10 milliseconds, 15 milliseconds, 25 milliseconds, 30 milliseconds, 35 milliseconds, etc. Persons of ordinary skill in the art would recognize that the system may be configured to switch beacon formats using different time intervals. Repeatedly transmitting beacon telemetry data using different formats may enable the intelligent fixtures to interact with a wide variety of mobile devices with low latency.

A mobile device receiving telemetry data transmitted by the intelligent fixtures may use the received telemetry data to determine the location of the mobile device relative to one or more intelligent fixtures. For example, a mobile device receiving an RSSI value and/or a UUID value associated with an intelligent fixture may use this information to estimate the location of the mobile device. In cases where radiation patterns (omni or directional) between two or more intelligent fixtures overlap so that they are both detected by the mobile device, the mobile device may estimate its location based on both the received RSSI and/or UUID values. For example, the mobile device may use multilateration to determine its location based on the relative strength of each received RSSI value, which may be used to estimate the distance to the corresponding intelligent fixture, and the location of the corresponding intelligent fixture, which may be determined from the UUID.

In block 1112, the process 1100 may configure the antenna array of one or more intelligent fixtures to transmit data having one type of protocol (e.g., the Bluetooth Smart™ format). The antenna array may be configured to transmit this data using a radiation pattern optimized for data communication, such as an omni-directional radiation pattern.

The process 1100 may then proceed to block 1114 and transmit data and a control profile (e.g., a Bluetooth Smart data and control profile) from one or more intelligent fixtures. A mobile device running a compatible protocol (e.g., the Bluetooth Smart Ready™ protocol) may then be paired to one or more of the intelligent fixtures using the transmitted data. In block 1116, one or more of the intelligent fixtures may determine whether or not a mobile device is attempting to pair with the intelligent fixture. If the process 1100 determines that no mobile devices are attempting to pair with an intelligent fixture ("NO" branch of decision block 1116), then the process 1100 may return to block 1104, and continue transmitting beacon telemetry data.

If the process 1100 determines a mobile device is attempting to pair with an intelligent fixture ("YES" branch of decision block 1116), the process 1100 may proceed to block 1118. In block 1118, the process 1100 may interrogate the mobile device and determine if the mobile device is an appropriate device for pairing. The process 1100 may make this determination, for example, by checking a database of known good devices to determine if the mobile device is a known good device.

If the mobile device is invalid or otherwise not appropriate for pairing ("NO" branch of decision block 1120), the process 1100 may return to block 1104 and continue transmitting beacon telemetry data. If the mobile device is determined to be a valid device ("YES" branch of decision block 1120), the process 1000 may pair the mobile device with one of the intelligent fixtures.

In an embodiment of the invention, the mobile device may interact with the system to control various functions. For example, the mobile device may interact with the system to perform lighting control functions, to modify system setup parameters, and/or to provide data to the intelligent fixtures in order to implement firmware updates. To this end, in block 1122, the process 1100 may check data received from the mobile device against a database of queries and/or commands. If the process 1100 determines that the mobile device is attempting to perform functions related to lighting control ("YES" branch of decision block 1124), the process 1100 may proceed to block 1126. In block 1126, the process 1100 may provide updated lighting control parameters to the intelligent fixtures. In turn, the intelligent fixtures may update lighting control parameters based on the data supplied by the mobile device. The process 1100 may then return to block 1104 and continue transmitting beacon telemetry data.

If the mobile device is not requesting lighting control functions ("NO" branch of decision block 1124), the process 1100 may proceed to block 1128 and determine whether or not the mobile device is requesting updates to the system and/or a modification of the setup configuration of the system. If the process 1100 determines that the system or setup configuration is to be updated ("YES" branch of decision block 1128), the process 1100 may proceed to block 1130 and update the system configuration or setup data. The process may then return to block 1104 and continue transmitting beacon telemetry data.

If the process 1100 determines that the mobile device is not requesting updates to the system configuration or setup data ("NO" branch of decision block 1128), the process 1100 may proceed to block 1132 and determine whether or not the mobile device is requesting implementation of over-the-air firmware updates. If the process 1100 determines the mobile device is requesting over-the-air firmware updates ("YES" branch of decision block 1132), the process 1100 may proceed to block 1134 and implement the over-the-air firmware updates. The process 1100 may then return to block 1104 and continue to transmit beacon telemetry data.

If the process 1100 determines that the mobile device is not requesting over-the-air firmware updates ("NO" branch of decision block 1132), the process 1100 may proceed to block 1136 (FIG. 11B). In block 1136, the process 1100 may check data that is provided by color and ambient light sensors against requested data set points to determine if changes need to be made, such as changes to the output of one or more light fixtures. If any changes need to be made ("YES" branch of decision block 1138), the process 1100 may proceed to block 1140 and communicate the updates to the system, e.g., the affected intelligent fixtures and/or controller fixture. The process 1100 may then proceed to block 1142. If the process 1100 determines that no changes need to be made ("NO" branch of decision block 1138), the process 1100 may proceed directly to block 1142.

In block 1142, the process 1100 may check data that is provided by temperature and humidity sensors against requested data set points to determine if changes need to be made, e.g., to the settings of an HVAC system. If the process 1100 determines changes have occurred in measured values of temperature and humidity relative to the data set points ("YES" branch of decision block 1142), the process 1100 may proceed to block 1146. In block 1146, the process 1100 may communicate the updates to the appropriate system, e.g., the HVAC system, and proceed to block 1148. If the process 1100 determines that no changes need to be made ("NO" branch of decision block 1144), the process 1100 may proceed directly to block 1148.

In block 1148, the process 1000 may check data that is provided by motion detection sensors against requested data set points to determine if changes need to be made, e.g., to sensitivity settings that detect the presence or absence of persons in an area of the building. If the process 1100 determines changes have occurred in measured values of motion detection data relative to data set points ("YES" branch of decision block 1150), the process 1100 may proceed to block 1152 and communicate the updates to the appropriate system before proceeding to block 1154. If the process 1100 determines that no changes need to be made ("NO" branch of decision block 1150), the process 1100 may proceed directly to block 1154.

In block 1154, the system may check data that is provided by near field communication (NFC) sensors against requested data set points to determine if changes need to be made. If the process 1100 determines changes have occurred in measured values of NFC data relative to data set points ("YES" branch of decision block 1156), the process may proceed to block 1158 and communicate the updates to the appropriate system before proceeding to block 1160. If the process 1100 determines that no changes need to be made ("NO" branch of decision block 1156), the process 1100 may proceed directly to block 1160.

In block 1160, the process 1100 may check data that is provided by machine vision sensors (e.g., cameras) against requested data set points to determine if changes need to be made. If the process 1100 determines changes have occurred in measured values of machine vision data relative to data set points ("YES" branch of decision block 1162), the process 1100 may proceed to block 1164 and communicate the updates to the appropriate system before proceeding to block 1166. If the process 1100 determines that no changes need to be made ("NO" branch of decision block 1162), the process 1100 may return to block 1104, and continue transmitting beacon telemetry data.

In block 1166, the process 1100 may determine if a Wi-Fi system packet is available. If a Wi-Fi system packet is available ("YES" branch of decision block 1166), the process 1100 may proceed to block 1168. In block 1168, the process 1100 may receive the Wi-Fi system packet and update the system according to data contained therein before returning to block 1104 to continue transmitting beacon telemetry data. If the Wi-Fi system packet is not available ("NO" branch of decision block 1166), the process 1100 may return directly to block 1104 and continue transmitting beacon telemetry data.

Figure 12:
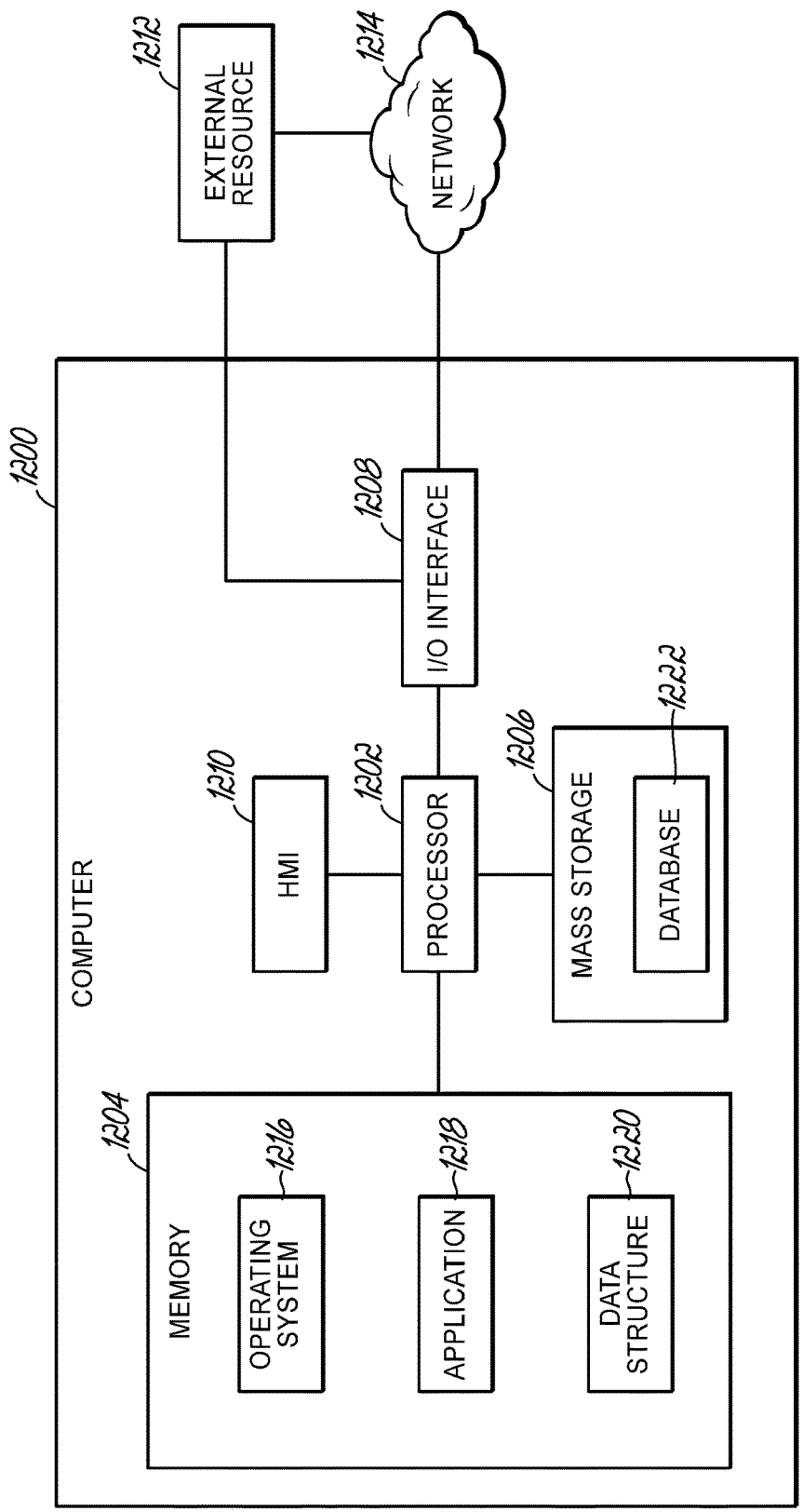
FIG. 12 a diagrammatic view of an exemplary computing system that may be used to implement embodiments of the invention.

FIG. 12 is a block diagram of an exemplary computer system 1200 that may be used to implement embodiments of the invention, or portions thereof, e.g., the mobile devices, intelligent fixtures, and/or other computing devices. The computer system 1200 may include a processor 1202, a memory 1204, a mass storage memory device 1206, an input/output (I/O) interface 1208, and a Human Machine Interface (HMI) 1210. The computer system 1200 may also be operatively coupled to one or more external resources 1212 via a network 1214 and/or the I/O interface 1208. External resources may include, but are not limited to, servers, databases, mass storage devices, peripheral devices, cloud-based network services, or any other suitable computer resource that may be used by the computer system 1200.

The processor 1202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1204. Memory 1204 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1206 may include data storage devices such as a hard drive, optical drive, tape drive, volatile or non-volatile solid state device, or any other device capable of storing information.

The processor 1202 may operate under the control of an operating system 1216 that resides in memory 1204. The operating system 1216 may manage computer resources so that computer program code embodied as one or more computer software applications, such as an application 1218 residing in memory 1204, may have instructions executed by the processor 1202. In an alternative embodiment, the processor 1202 may execute the application 1218 directly, in which case the operating system 1216 may be omitted. One or more data structures 1220 may also reside in memory 1204, and may be used by the processor 1202, operating system 1216, or application 1218 to store or manipulate data.

The I/O interface 1208 may provide a machine interface that operatively couples the processor 1202 to other devices and systems, such as the network 1214 or external resource 1212. The application 1218 may thereby work cooperatively with the network 1214 or external resource 1212 by communicating via the I/O interface 1208 to provide the various features, functions, applications, processes, or modules comprising embodiments of the invention. The application 1218 may also have program code that is executed by one or more external resources 1212, or otherwise rely on functions or signals provided by other system or network components external to the computer system 1200. Indeed, given the nearly endless hardware and software configurations possible, persons having ordinary skill in the art will understand that embodiments of the invention may include applications that are located externally to the computer system 1200, distributed among multiple computers or other external resources 1212, or provided by computing resources (hardware and software) that are provided as a service over the network 1214, such as a cloud computing service.

The HMI 1210 may be operatively coupled to the processor 1202 of computer system 1200 in a known manner to allow a user to interact directly with the computer system 1200. The HMI 1210 may include video or alphanumeric displays, a touch screen, a speaker, and any other suitable audio and visual indicators capable of providing data to the user. The HMI 1210 may also include input devices and controls such as an alphanumeric keyboard, a pointing device, keypads, pushbuttons, control knobs, microphones, etc., capable of accepting commands or input from the user and transmitting the entered input to the processor 1202.

A database 1222 may reside on the mass storage memory device 1206, and may be used to collect and organize data used by the various systems and modules described herein. The database 1222 may include data and supporting data structures that store and organize the data. In particular, the database 1222 may be arranged with any database organization or structure including, but not limited to, a relational database, a hierarchical database, a network database, or combinations thereof. A database management system in the form of a computer software application executing as instructions on the processor 1202 may be used to access the information or data stored in records of the database 1222 in response to a query, where a query may be dynamically determined and executed by the operating system 1216, other applications 1218, or one or more modules.

In an embodiment of the invention, the mobile device may include a mobile application that, in response to receiving a Bluetooth beacon including a UUID, determines an action based on the UUID. This action may include, for example, querying a lookup table or database stored on the mobile device 102 and/or "in the cloud" for instructions. The instructions may cause the application to transmit information (e.g., the UUID and/or user identity) to a server or computing system associated with a merchant. This information may be transmitted using Wi-Fi or Bluetooth packets transmitted to the intelligent fixture, data packets transmitted over a wireless data network provided by a wireless carrier, or using any other suitable method of communication.

The merchant system may determine the location of the user based on the received information and cause a nearby device, such as the user's mobile device or a machine proximate to the user (e.g., a gasoline pump) to display information specific to the user. Information specific to the user may include information previously selected by the user as part of a customer loyalty program, and/or information selected by the merchant system based on the identity, location, and/or preferences of the user. Examples of user specific information may include weather forecasts, how many points are in the user's loyalty account, or specific types of news, such as scores for selected sports teams or political news stories. The information displayed to the user may also include an advertisement or other type of marketing promotion. Space for advertisements may be used by the merchant, or sold to a third party advertiser. The advertisement may include, for example, an offer to redeem points for an item, such as a beverage, food item, or other product sold proximate to the user's current location.

The user specific information may further include selectable payment options for a purchase. For example, the display may provide the user with the option of using one or more credit cards previously registered by the user for payment. Advantageously, this may allow the user to purchase a product (e.g., a tank of fuel) without having to present a physical form of payment or retrieve their wallet. This may allow the user to avoid exposing their form of payment to skimming or other types of theft.

At the time of payment, the merchant system may propose adding additional goods or services to the purchase based on the user's profile. For example, if the user has a history of purchasing a food product when filling up their vehicle, the merchant system may propose adding a food product to the purchase, which may be offered with a discount. In response to the user accepting the offer, the merchant system may provide instructions to the user on how to receive the product, e.g., instructions to see an attendant.

The mobile application may forward data to the merchant system that enables the merchant system to track users' locations within a store as well as their purchase histories. This type of data may be stored in a database that enables the merchant to, for example, track sales by store and user, as well as maintain data on user behavior, preferences, and/or responses to various promotions.

By way of another example, a UUID transmitted by an intelligent fixture illuminating a vehicle at a car dealership may be associated with information about the vehicle in the database. In response to the mobile device receiving this UUID (e.g., as the user approaches the vehicle), the mobile application may retrieve and display the information to the user based on the UUID. In addition, the intelligent fixture may alter the output of the light (e.g., change the intensity or color) in response to the mobile application querying the database so that the vehicle is presented favorably to the user. The mobile application may also manage or otherwise control lighting characteristics in other settings (e.g., a hospital) as discussed above.

As yet another example, the mobile application may provide a wayfinder function. To this end, the mobile application may determine a location of a product or destination entered by a user (i.e., a destination location) with respect to the current location of the mobile device as determined from one or more received beacons. For example, while shopping in a grocery store, the user may enter "bread" into the mobile application. The mobile application may then query a database for the location of the product, and direct the user to this location, e.g., by displaying directions or a map to the product from the current location of the mobile device. As the user moves toward the location of the product, the mobile application may continue to update the location of the mobile device based on beacon signals received along the route. The mobile application may use this updated location to help guide the user to the location of the product.

Figure 13:
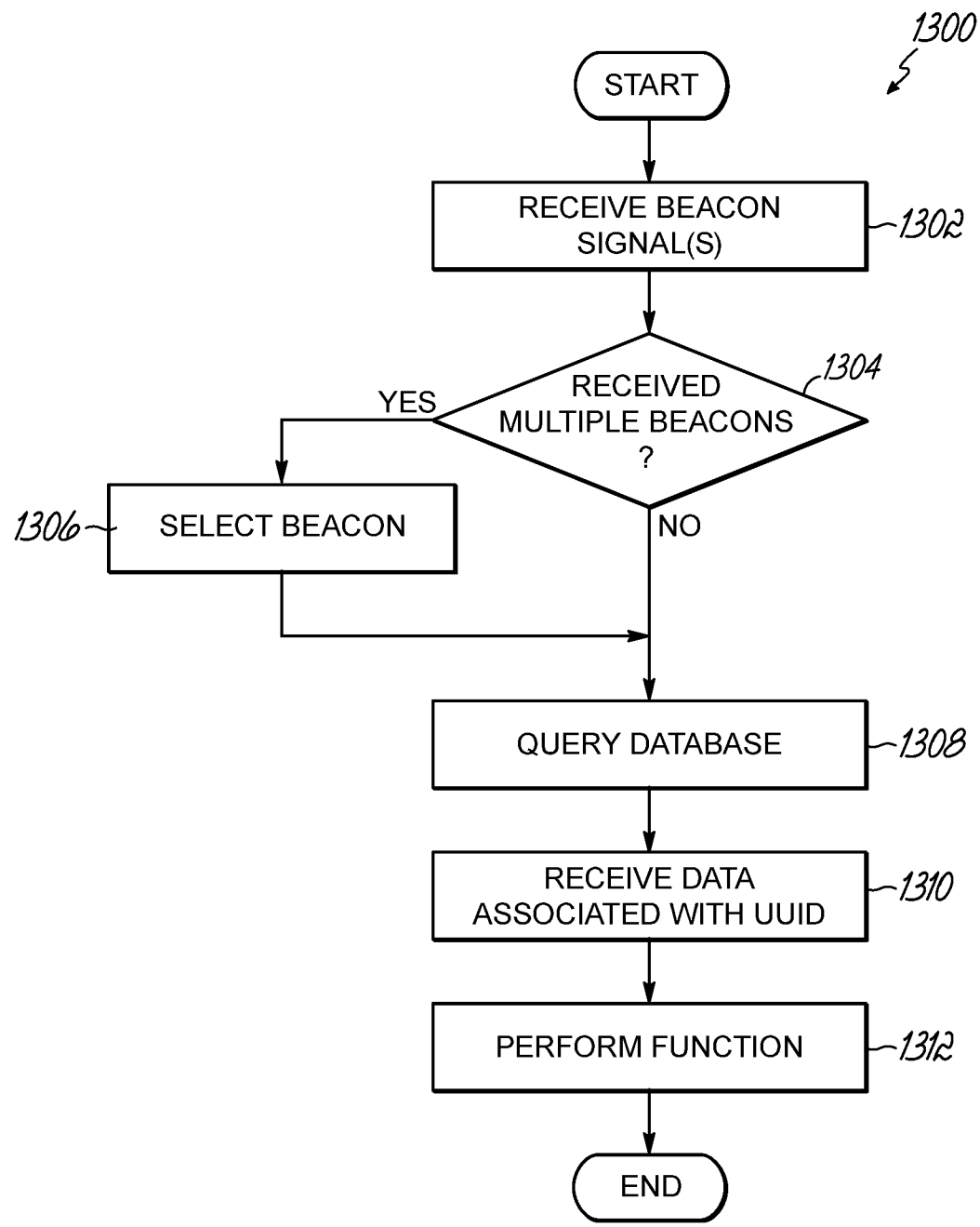
FIG. 13 is a flowchart illustrating a process for retrieving information from a database based on a UUID embedded in the beacon signal.

FIG. 13 illustrates a flowchart depicting a process 1300 for resolving a UUID, e.g., retrieving information and/or determining a location based on a received beacon signal. The process 1300 may be executed by an application on the mobile device, or by any other suitable computer system in communication with the mobile device.

In block 1302, the process 1300 receives one or more beacon signals each including a UUID. If the process 1300 determines that multiple beacons have been received ("YES" branch of decision block 1304), the process 1300 may proceed to block 1306 and select a beacon to resolve before proceeding to block 1308. Selecting a beacon to resolve may include extracting the UUID from the beacon, and determining a spatial resolution of the beacon based on the UUID, e.g., by looking up the spatial resolution associated with the UUID in a database. If one UUID is associated with a beacon having a spatial resolution known to be more accurate than the spatial extent of another UUID, the process 1300 may select the UUID associated with the beacon having the more accurate spatial resolution, e.g., being transmitted with a directional antenna. The process 1300 may also determine the RSSI of each beacon signal, and select the beacon having the strongest signal. The process 1300 may also select the UUID using some combination of RSSI and spatial resolution data. If the process 1300 determines that multiple beacons have not been received ("NO" branch of decision block 1304), the process 1300 may proceed to block 1308 without passing through block 1306.

In block 1308, the process 1300 may query a database for information associated with the UUID being resolved. By way of example, an entity that is associated with the beacon (e.g., a merchant) may maintain the database, or register the UUID with a service provider that maintains the database. In this scenario, the database may be remotely accessed by the process 1300 through a wide area network such as the Internet. The process 1300 may query the database by transmitting the UUID to the aforementioned remote database, or query a local database that is cached or otherwise maintained in the memory of the mobile device. For applications using cached databases, the application may update the cache periodically. In response to receiving the UUID, the database may identify data that is associated with the UUID.

In block 1310, the process 1300 may receive the data associated with the UUID from the database. The received data may include data relating to an offer by the merchant, advertisements, coupons, location, sales and promotions, services, sub-locations (such as the location of a product within a store), instructions to be executed by the mobile device, data identifying an application on the mobile device to be activated, data directing the mobile device to access a third party server and/or issue instructions to another computer system, or any other suitable data.

In block 1312, the process 1300 may perform a function based on the received data. Exemplary functions may include displaying a coupon, causing a payment to be made (e.g., to purchase an e-ticket for entering an exhibit), or adjusting ambient conditions (e.g., light level or color, temperature, humidity). That is, one or more applications on the mobile device may display information and/or perform some action based on the data received from the database. Actions may include launching another application, changing a status of the mobile device (e.g., causing the mobile device to enter a silent mode), activating a building control application that turns on lights, adjusts an HVAC system, etc.

In an embodiment of the invention, the received data may include a URL and activate a browser application on the mobile device. In response to being activated, the browser application may navigate to a web portal identified by the URL. This web portal may include data provided by the entity associated with the beacon, and/or data provided by the intelligent fixture transmitting the beacon.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of determining a location of a mobile device, the method comprising:
   transmitting, from an intelligent fixture, a first radio frequency signal having a first spatial resolution that produces a first coverage area; and
   transmitting, from the intelligent fixture, a second radio frequency signal having a second spatial resolution that is higher than the first spatial resolution and which produces a second coverage area within the first coverage area,
   wherein the mobile device is configured to determine an approximate location based on at least one of the first radio frequency signal and the second radio frequency signal, and
   the approximate location determined from the second radio frequency signal is more accurate than the approximate location determined from the first radio frequency signal.

2. The method of claim 1 further comprising:
receiving, at the intelligent fixture, at least one of a third signal transmitted by the mobile device in response to receiving the first radio frequency signal, or a fourth signal transmitted by the mobile device in response to receiving the second radio frequency signal, the at least one of the third signal or the fourth signal including data indicative of the approximate location of the mobile device.

3. The method of claim 2, further comprising:
in response to receiving the third or the fourth signal, transmitting a fifth signal to the mobile device containing location specific information based on the approximate location of the mobile device.

4. The method of claim 1, further comprising:
transmitting the first radio frequency signal using an omni-directional radiation pattern having a first spatial extent; and
transmitting the second radio frequency signal using a directional radiation pattern having a second spatial extent that is smaller than the first spatial extent.

5. The method of claim 4 wherein:
the directional radiation pattern is a downward directed beam that produces the second coverage area on a floor of an enclosed space, and
the omni-directional radiation pattern extends beyond the directional radiation pattern and produces the first coverage area on the floor of the enclosed space that is larger than the second coverage area.

6. The method of claim 5, wherein the mobile device determines the approximate location based on at least one of the first radio frequency signal and the second radio frequency signal by:
determining the approximate location is within the second coverage area when the second radio frequency signal is received by the mobile device; and
determining the approximate location is not within the second coverage area when the second radio frequency signal is not received by the mobile device.

7. The method of claim 4 wherein the first radio frequency signal and the second radio frequency signal are transmitted using a reconfigurable antenna, or the first radio frequency signal is transmitted using an omni-directional antenna and the second radio frequency signal is transmitted using a directional antenna.

8. The method of claim 1 wherein the intelligent fixture is located in a ceiling of an enclosed space.

9. The method of claim 1 wherein the first radio frequency signal carries first data defining a first universally unique identifier, and the second radio frequency signal carries second data defining a second universally unique identifier.

10. The method of claim 1 wherein the intelligent fixture is a first intelligent fixture, and further comprising:
transmitting, from a second intelligent fixture, a third signal having a third spatial resolution;
wherein the mobile device is configured to determine the approximate location based on the at least one of the first radio frequency signal and the second radio frequency signal, the third signal, and a relative signal strength of each of the at least one of the first radio frequency signal and the second radio frequency signal, and the third signal.

11. An intelligent fixture comprising:
one or more transmitters that transmit a first radio frequency signal having a first spatial resolution that produces a first coverage area and a second radio frequency signal having a second spatial resolution that is higher than the first spatial resolution and which produces a second coverage area within the first coverage area;
wherein a mobile device determines an approximate location based on at least one of the first radio frequency signal and the second radio frequency signal, and
the approximate location determined from the second radio frequency signal is more accurate than the approximate location determined from the first radio frequency signal.

12. The intelligent fixture of claim 11 further comprising:
one or more receivers that receive one or more of a third signal transmitted by the mobile device in response to the mobile device receiving the first radio frequency signal, or a fourth signal transmitted by the mobile device in response to the mobile device receiving the second radio frequency signal, the at least one of the third signal or the fourth signal including data indicative of the approximate location of the mobile device.

13. The intelligent fixture of claim 11 further comprising:
a reconfigurable antenna configured to:
transmit the first radio frequency signal with an omni-directional radiation pattern having a first spatial extent; and
transmit the second radio frequency signal with a directional radiation pattern having a second spatial extent that is smaller than the first spatial extent.

14. The intelligent fixture of claim 11 further comprising:
an omni-directional antenna that transmits the first radio frequency signal with a first radiation pattern having a first spatial extent; and
a directional antenna that transmits the second radio frequency signal with a second radiation pattern having a second spatial extent that is smaller than the first spatial extent.

15. The intelligent fixture of claim 14 wherein:
the second radiation pattern is a downward directed beam that produces the second coverage area on a floor of an enclosed space, and
the first radiation pattern extends beyond the second radiation pattern and produces the first coverage area on the floor of the enclosed space that is smaller larger than the first second coverage area.

16. The intelligent fixture of claim 11, wherein the intelligent fixture is further configured to:
transmit a third signal to the mobile device containing location specific information based on the approximate location of the mobile device.

17. A method of locating a mobile device, the method comprising:
receiving, at the mobile device from a single anchor node of a positioning system, one or more of a first radio frequency signal having a first spatial resolution that produces a first coverage area, and a second radio frequency signal having a second spatial resolution that is higher than the first spatial resolution and which produces a second coverage area within the first coverage area;
in response to receiving the first radio frequency signal, determining a first approximate location based on the first radio frequency signal, and
in response to receiving the second radio frequency signal, determining a second approximate location based on the second radio frequency signal.

18. The method of claim 17, further comprising:
transmitting, by the mobile device, a third signal conveying first data indicative of one of the first approximate location or the second approximate location;
receiving, at the mobile device, a fourth signal conveying second data indicative of a destination location; and
displaying, by the mobile device, instructions for moving from the one of the first approximate location or the second approximate location to the destination location.

19. The method of claim 18 wherein the destination location is a location proximate to a product in a store.

20. The method of claim 17, further comprising:
transmitting, by the mobile device, a third signal conveying first data indicative of one of the first approximate location or the second approximate location;
receiving, at the mobile device, a fourth signal conveying second data that defines a marketing promotion, a coupon, or user specific information; and
displaying, by the mobile device, the marketing promotion, the coupon, or the user specific information.

21. A mobile device comprising:
a receiver that receives, from a single anchor node of a positioning system, one or more of a first radio frequency signal having a first spatial resolution that produces a first coverage area, and a second radio frequency signal having a second spatial resolution that is higher than the first spatial resolution and which produces a second coverage area within the first coverage area;
a processor configured to, in response to receiving the first radio frequency signal, determine a first approximate location based on the first radio frequency signal, and in response to receiving the second radio frequency signal, determine a second approximate location based on the second radio frequency signal.

22. A computer program product for determining a location of a mobile device, the computer program product comprising:
a non-transitory computer-readable storage medium; and
program code stored on the non-transitory computer-readable storage medium that, when executed by one or more processors of an intelligent fixture, causes the intelligent fixture to:
transmit a first radio frequency signal having a first spatial resolution that produces a first coverage area; and
transmit a second radio frequency signal having a second spatial resolution that is higher than the first spatial resolution and which produces a second coverage area within the first coverage area,
wherein the mobile device is configured to determine an approximate location based on at least one of the first radio frequency signal and the second radio frequency signal, and
the approximate location determined from the second radio frequency signal is more accurate than the approximate location determined from the first radio frequency signal.

23. A computer program product for determining a location of a mobile device, the computer program product comprising:
a non-transitory computer-readable storage medium; and
program code stored on the non-transitory computer-readable storage medium that, when executed by one or more processors of the mobile device, causes the mobile device to:
receive, from a single anchor node of a positioning system, one or more of a first radio frequency signal having a first spatial resolution that produces a first coverage area, and a second radio frequency signal having a second spatial resolution that is higher than the first spatial resolution and which produces a second coverage area within the first coverage area;
in response to receiving the first radio frequency signal, determine a first approximate location based on the first radio frequency signal, and
in response to receiving the second radio frequency signal, determine a second approximate location based on the second radio frequency signal.

* * * * *

UNITED STATES PATENT AND TRADEMARK OFFICE
CERTIFICATE OF CORRECTION

PATENT NO. : 10,390,183 B2
APPLICATION NO. : 15/441968
DATED : August 20, 2019
INVENTOR(S) : Bobby Duane Taylor Page 1 of 1

It is certified that error appears in the above-identified patent and that said Letters Patent is hereby corrected as shown below:

In the Claims

Column 26, Line 44-45 Claim 15 reads:
"… on the floor of the enclosed space that is smaller larger than the first second coverage area."
But should be:
"… on the floor of the enclosed space that is larger than the second coverage area."

Signed and Sealed this
Nineteenth Day of November, 2019

Andrei Iancu
*Director of the United States Patent and Trademark Office*